(12) United States Patent
Wang et al.

(10) Patent No.: US 11,861,023 B2
(45) Date of Patent: Jan. 2, 2024

(54) MATCHING CRYPTOGRAPHIC COMPUTING RESOURCES TO THE PREDICTED REQUIREMENTS FOR DECRYPTING ENCRYPTED COMMUNICATIONS

(71) Applicant: International Business Machines Corporation, Armonk, NY (US)

(72) Inventors: Heng Wang, Beijing (CN); Wan Yue Chen, Beijing (CN); Chen Guang Liu, Beijing (CN); Jing Li, Beijing (CN); Xiao Ling Chen, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 17/411,383

(22) Filed: Aug. 25, 2021

(65) Prior Publication Data

US 2023/0068521 A1 Mar. 2, 2023

(51) Int. Cl.
 *G06F 21/60* (2013.01)
 *G06N 20/00* (2019.01)
(52) U.S. Cl.
 CPC ........... *G06F 21/602* (2013.01); *G06N 20/00* (2019.01)
(58) Field of Classification Search
 CPC .............................. G06F 21/602; G06N 20/00
 See application file for complete search history.

(56) References Cited

U.S. PATENT DOCUMENTS 7,216,236 B2   5/2007 Kou et al.
11,475,140 B1 * 10/2022 Buonora ................. G06F 21/62
(Continued)

FOREIGN PATENT DOCUMENTS

CN     1478348 A     2/2004
CN   105208024 A    12/2015

OTHER PUBLICATIONS

International Search Report and Written Opinion dated Aug. 26, 2022 in PCT/CN2022/095615 (9 pages).
(Continued)

*Primary Examiner* — Hee K Song
(74) *Attorney, Agent, or Firm* — CANTOR COLBURN LLP; Teddi Maranzano

(57) ABSTRACT

Embodiments of the invention include a computer-implemented method that uses a processor to access cryptographic-function constraints associated with an encrypted message. Based on a determination that the cryptographic-function constraints do not include mandatory cryptographic computing resource requirements, first resource-scaling operations are performed that include an analysis of cryptographic metrics associated with a processor. The cryptographic metrics include information associated with the encrypted message, along with performance measurements of cryptographic functions performed by the processor. The cryptographic-function constraints and results of the analysis of the cryptographic metrics are used to determine cryptographic processing requirements of the encrypted message; and match the cryptographic processing requirements to selected ones of a set of cryptographic computing resources to identify a customized set of cryptographic computing resources matched to cryptographic processing requirements of the encrypted message. The customized set of cryptographic computing resources is used to perform customized cryptographic functions on the encrypted message.

20 Claims, 12 Drawing Sheets

(56) References Cited

U.S. PATENT DOCUMENTS

| | | |
|---|---|---|
| 2016/0352870 A1 | 12/2016 | Manapragada et al. |
| 2018/0198627 A1* | 7/2018 | Mullins ................ H04L 9/3066 |
| 2019/0124054 A1 | 4/2019 | Zhang et al. |
| 2021/0200882 A1* | 7/2021 | Maor .................... H04L 9/0897 |
| 2023/0026253 A1* | 1/2023 | Beveridge ................ H04L 9/14 |

OTHER PUBLICATIONS

Curry, "Autoscaling and Orchestration with NGINX Plus and Chef." NGINX. Dec. 2017. 11 pages.
Khalil-Hani et al., "Hardware Acceleration of OpenSSL cryptographic functions for high-performance Internet Security." 2010 International Conference on Intelligent Systems, Modelling and Simulation. IEEE, 2010, pp. 374-379.
Nelson, "SSL/TLS Offloading, Encryption, and Certificates with NGINX and NGINX Plus." NGINX. Apr. 2014. 6 pages.
Ylinen, "Hardware Accelerated SSL/TLS Termination in Ingress Controllers using Kubernetes Device Plugins and RuntimeClass". Kubernetes.io Blog. Apr. 2019. 5 pages.

* cited by examiner

MATCHING CRYPTOGRAPHIC COMPUTING RESOURCES TO THE PREDICTED REQUIREMENTS FOR DECRYPTING ENCRYPTED COMMUNICATIONS

BACKGROUND

The present invention relates generally to programmable computer systems. More specifically, the present invention relates to computer systems, computer-implemented methods, and computer program products that automatically match or scale cryptographic computing resources to the predicted and/or mandatory requirements for decrypting encrypted communications, including, for example, encrypted connection requests such as hypertext transfer protocol secure (HTTPS) messages.

HTTPS is the secure version of HTTP, which is the primary protocol used to send data between a web browser and a website server. HTTPS is encrypted in order to increase security of data transfer. This is particularly important when users transmit sensitive data, such as by logging into a website of a financial account, an email service, or a health insurance provider. HTTPS uses an encryption protocol to encrypt communications. The protocol is known as transport layer security (TLS) and was formerly known as secure sockets layer (SSL). The TLS (or SSL) protocol secures communications by using what is known as an asymmetric public key infrastructure. This type of security system uses two different keys to encrypt communications between two parties, namely a private key and a public key. The private key is controlled by the owner of a website and is kept private. The private key lives on a web-server and is used to decrypt information encrypted by the public key. The public key is available to everyone who wants to interact with the server in a way that is secure. Information that is encrypted by the public key can only be decrypted by the private key.

Sensitive application data can be sealed by a secure enclave on a worker node. A secure enclave is an isolated and trusted area of memory where critical aspects of application functionality are protected, which helps keep sensitive application data confidential and unmodified. In other words, the secure enclave is an encrypted portion of main memory. The secure enclave is hardened by processor-based security mechanisms. Tagging security to a sealed cryptographic key derived from a given machine's hardware (e.g., the worker node's processor chip) is highly secure.

The operational performance of the computer processing unit(s) (CPUs) of a computer system can be slowed down by the amount and nature of the processing tasks the CPU must perform. Cryptographic acceleration and coprocessors attempt to improve hardware performance by assisting the CPU with its required tasks. Cryptographic acceleration is a software-based tool that attempts to speed up overall system performance by providing additional hardware, such as a coprocessor, where cryptographic algorithms can perform cryptographic operations (or functions) separately from the CPU processing core, thereby freeing up CPU processing cores to focus on other functions and operations. Coprocessors are supplementary processors in that they can be configured to take over the performance of selected processor-intensive tasks of an associated CPU in order to allow the CPU to focus its computing resources on tasks that are essential to the overall system.

Known cryptographic acceleration and coprocessors do not address the efficiency of cryptographic operations. For example, web-servers usually utilize open-source software (e.g., OpenSSL®) to perform HTTPS decryption due to performance and key protection considerations. Suitable open-source software (OSS) can include an engine that delivers or routes encrypted connection requests received at the web-server to a determined cryptographic computing resource. However, the determined cryptographic computing resource is not specifically aligned to (or matched with) the cryptographic operations required by the encrypted connection request. For example, under some conditions, the appropriate cryptographic processing for the encrypted connection request must be performed in a high security computing resource (e.g., a cloud HSM (hardware security module)), and under other conditions, the appropriated cryptographic processing for the encrypted connection request does not need to be performed in a high security computing resource.

Accordingly, known techniques for performing cryptographic operations do not improve the efficiency of such cryptographic operations, which results in the wasteful and inefficient over-usage of cryptographic computing resources, including specifically high-security cryptographic computing resources.

SUMMARY

Embodiments of the invention include a computer-implemented method that uses a processor system to access an operation policy (OP) of resource-scaling (RS) data associated with an encrypted message, wherein the OP defines cryptographic-operation constraints. Based at least in part on a determination that the cryptographic-operation constraints do not include mandatory cryptographic computing resource requirements, first resource-scaling operations are performed that include performing an analysis of cryptographic metrics associated with the processor system. The cryptographic metrics include information associated with the encrypted message, along with performance measurements that result from cryptographic operations performed by the processor system. The cryptographic-operation constraints and results of the analysis of the cryptographic metrics are used to determine cryptographic processing requirements of the encrypted message, and are further used to match the determined cryptographic processing requirements to selected ones of a set of available cryptographic computing resources, thereby identifying or selecting a customized set of cryptographic computing resources that match the cryptographic processing requirements of the encrypted message. The customized set of cryptographic computing resources is used to perform customized cryptographic operations on the encrypted message.

Technical benefits provided by the above-described embodiments of the invention include segmenting out any mandatory cryptographic resource requirements to ensure that the mandatory requirements are applied properly because mandatory cryptographic resource requirements are typically applied to encrypted messages with higher security levels that require more secure cryptographic resources. By segmenting out the messages with mandatory cryptographic resource requirements, the remaining message types can be more efficiently matched with the cryptographic computing resources they need. By using both cryptographic constraints and cryptographic metrics to match the remaining message types to the cryptographic computing resources they need, the actual historical performance of the cryptographic hardware can be leveraged to improve this matching operation.

The above-described embodiments of the invention can further include configuring open-source cryptographic software to receive a request to perform cryptographic operations on the encrypted message; and route the request to the processor system instead of performing the request.

Technical benefits provided by the above-described embodiments of the invention include allowing existing open-source software to be efficiently modified to incorporate features and functionality of the various embodiments of the invention.

The above-described embodiments of the invention can further include having the first resource-scaling operations include capturing a first set of updated cryptographic metrics that result from using the customized set of cryptographic computing resources to perform the customized cryptographic operations on the encrypted message; and updating the cryptographic metrics with the first set of updated cryptographic metrics.

Technical benefits provided by the above-described embodiments of the invention include allowing the computer-implemented method to accumulate data from each iteration of the computer-implemented method and using the accumulation data to improve subsequent iterations of the computer-implemented method.

Embodiments of the invention also provide computer systems and computer program products for having substantially the same features as the computer-implemented method described above.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
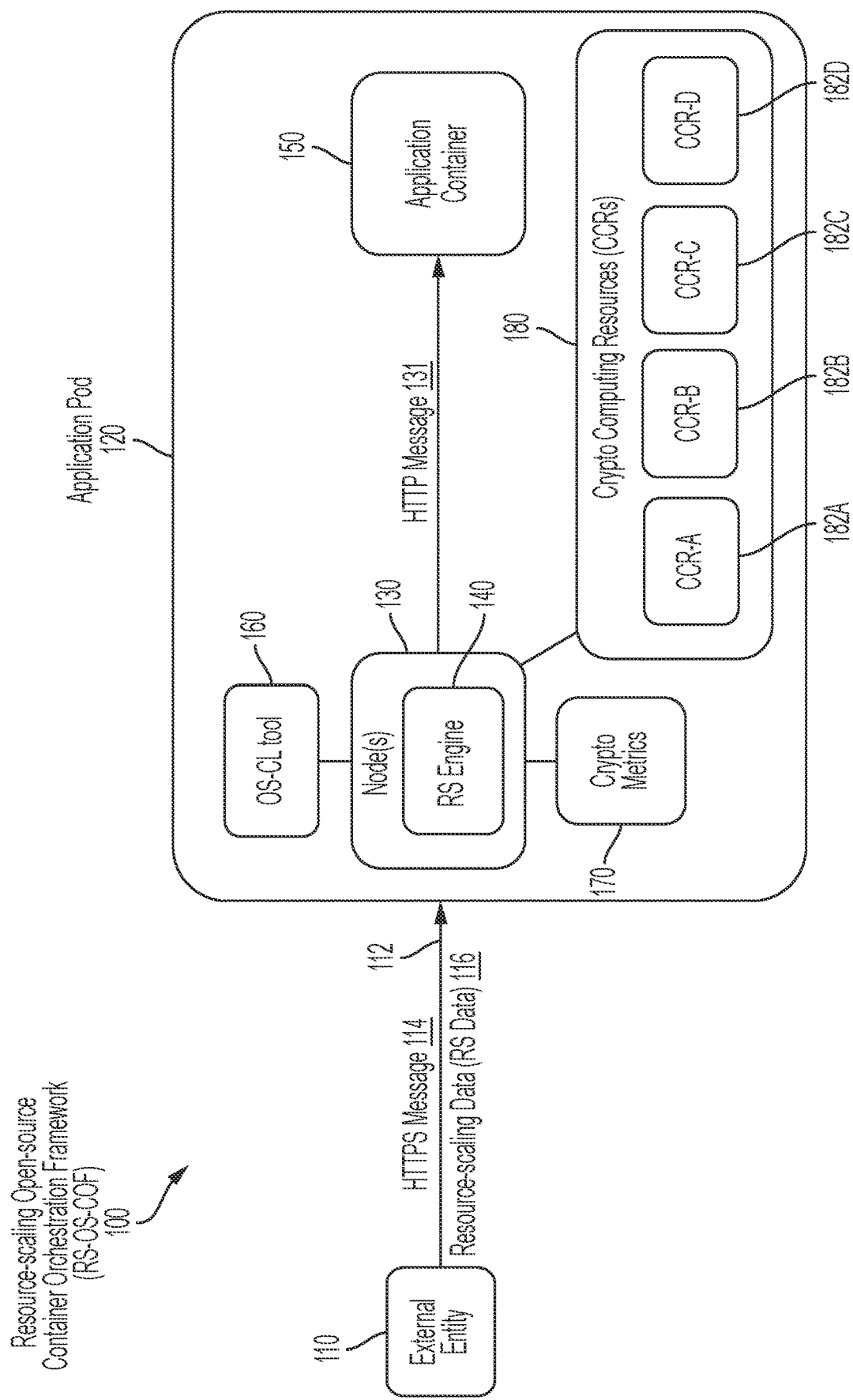
FIG. 1 depicts a diagram illustrating a communications system embodying aspects of the invention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the function units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the invention, the operations performed by the various components, modules, sub-functions, and the like can be distributed differently than shown without departing from the scope of the various embodiments of the invention describe herein unless it is specifically stated otherwise.

For convenience, some of the technical functions and/or operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the informal expression's corresponding more formal and technical description.

Turning now to an overview of aspects of the invention, embodiments of the invention provide computer systems, computer-implemented methods, and computer program products that receive an encrypted message and associated resource-scaling (RS) data; use RS constraints in the RS data to determine that the encrypted message does not have mandatory cryptographic processing requirements; determine cryptographic metrics derived from cryptographic operations performed by a processor system; use the RS constraints and the cryptographic metrics to determine and/or predict the non-mandatory cryptographic processing requirements for the encrypted message; use the determined and/or predicted cryptographic processing requirements to identify and/or select a matching and/or customized set of cryptographic computing resources from among a set of available cryptographic computing resources; and use the matching and/or customized set of cryptographic computing resources to perform customized cryptographic operations (e.g., customized decryption) on the encrypted message.

In embodiments of the invention, the set of available cryptographic computing resources can be selected to align with the various types of cryptographic processing requirements that are expected for the various types of encrypted message that can be transmitted. In accordance with aspects of the invention, the cryptographic computing resource(s) that align with a particular type of encrypted message are the cryptographic computing resources that efficiently apply cryptographic operations to the particular type of encrypted message without wasting cryptographic computing resources. Accordingly, embodiments of the invention can be used to match the predicted cryptographic processing requirements of the encrypted message to a tailored or customized subset of the available cryptographic computing resources, thereby improving the efficiency of how the available cryptographic computing resources are applied. Accordingly, embodiments of the invention perform cryptographic operations in a novel manner that improves the efficiency of such cryptographic operations, which results in the non-wasteful and efficient usage of cryptographic computing resources, including specifically high-security cryptographic computing resources.

The above-described aspects of the invention, as well as other aspects of the invention, are described herein as RS (resource-scaling) functionality. Some embodiments of the invention can be implemented using an open-source container orchestration framework (OS-COF) that has been modified in accordance with aspects of the invention to incorporate the various novel RS functionalities and/or features described herein, thereby forming a novel RS-OS-COF embodying aspects of the invention. The novel RS-OS-COF can be configured to include open-source software (e.g., OpenSSL software) and a cluster of interconnected physical and/or virtual computing nodes (i.e., machines) configured to provide automatic deployment and management of containerized applications.

The RS-OS-COF cluster of nodes can contain two types of nodes, namely a master node and one or more worker nodes. The master node is responsible for managing worker nodes in the cluster. The master node is the entry point for all operations to be executed in the cluster that are received from, for example, an application programming interface, a user interface, or an open-source software (OSS) interface. The worker node is responsible for running one or more workloads and networking with different workloads running on other worker nodes in the cluster. In accordance with aspects of the invention, the master node of the RS-OS-COF cluster of nodes is modified to include RS functionality, thereby forming an RS-OS-COF working node.

The basic scheduling unit in the RS-OS-COF worker node is a container, such as, for example, a pod. The container can be co-located on the worker node and share resources. Each container in the RS-OS-COF is assigned a unique container internet protocol address within the cluster of worker nodes, which allows applications to use ports without the risk of conflict. A service is a set of RS-OS-COF containers that work together, such as one tier of a multi-tier application.

The novel RS-OS-COF can be configured to receive the encrypted message, which can take a variety of forms, including, for example, an HTTPS connection request. An example of a suitable RS-OS-COF is a Kubernetes® open-source platform that has been modified to incorporate various aspects of the novel RS functionality described herein. In some aspects of the invention, the encrypted message is received at the RS-OS-COF node, and the node issues a request to the OSS to perform cryptographic operations on the encrypted message to decrypt or unpack the encrypted message and generate a decrypted or unpacked message for downstream processing. In some embodiments of the invention, the OSS can be a modified off-the-shelf OS-COF tool that has the capability of performing known cryptographic operations in a conventional (or known) manner but has been modified to, based at least in part on receiving a request to perform cryptographic operations on an encrypted message, route the cryptographic operations to a novel RS engine of the RS-OS-COF worker node. In embodiments of the invention, the RS engine is configured to provide a hardware implementation of cryptographic operations in accordance with aspects of the invention. In some embodiments of the invention, the RS engine's implementation and control of cryptographic algorithms and operations in accordance with aspects of the invention offer improved performance over known cryptographic operations, which result in the non-wasteful and efficient usage of cryptographic computing resources, including specifically high-security cryptographic computing resources.

In embodiments of the invention, a novel set (or stream) of RS data having multiple fields is associated with the encrypted message and received at the RS-OS-COF. The RS data includes at least one field that defines an operation policy (OP), and the OP includes multiple sub-fields that define cryptographic-operation constraints that are applied or utilized by the RS engine when it determines, predicts, and/or estimates the cryptographic processing requirements for the encrypted message. In addition, the RS engine is configured to generate and analyze cryptographic metric that are associated with (and derived from) all cryptographic operations performed by the RS-OS-COF. In embodiments of the invention, the cryptographic metrics include information associated with the encrypted message, along with performance measurements that result from cryptographic operations that have been performed by the RS-OS-COF.

If the cryptographic-operation constraints specify mandatory cryptographic computing resources that must be applied to the encrypted message, the RS engine performs a set of non-predictive RS operations, wherein the RS engine does not need to perform any analysis that predicts, determines, and/or estimates the cryptographic processing requirements for the encrypted message. In the non-predictive RS operations, the specified mandatory cryptographic computing resources are selected from among the set of available cryptographic computing resources then used to apply non-predictive cryptographic operations to the encrypted message.

If the cryptographic-operation constraints do not specify mandatory cryptographic computing resources that must be applied to the encrypted message, the RS engine initiates a set of predictive RS operations that are configured to use the operation-policy constraints and the cryptographic metrics to predict, determine, and/or estimate the cryptographic processing requirement for the encrypted message. In embodiments of the invention, the predictive RS operations can include using the predicted cryptographic processing requirements to select "customized" or "scaled" cryptographic computing resources from among the set of available cryptographic computing resources; and can further include using the "selected," "customized," and/or "scaled" cryptographic computing resources to apply "selected,"

"customized," and/or "scaled" cryptographic operations to the encrypted message. In accordance with embodiments of the invention, the cryptographic-operation constraints of the RS data are specific to the encrypted message with which the RS data is associated, and different encrypted messages can have different RS data with different OPs.

In some embodiments of the invention, some or all of the predictive RS operations can be performed using a configuration of modules that collect, dispatch, analyze, and/or manage the data traffic that moves through the RS engine in the course of the RS engine identifying the "selected," "customized," and/or "scaled" cryptographic computing resources that will apply "selected," "customized," and/or "scaled" cryptographic operations to the encrypted message. In some embodiments of the invention, the modules include an algorithm handling module, a resource management module, and a configuration of data-traffic-related modules. In some embodiments of the invention, the data-traffic-related modules can include a traffic dispatcher module, a traffic analyzer module, and a traffic metrics collector module. In embodiments of the invention, the traffic analyzer module is configured to analyze the encrypted message based at least in part on dispatch principles. Additional details of how the configuration of modules operates to implement some or all of the predictive RS operations are provided subsequently herein.

In some embodiments of the invention, some or all of the predictive RS operations can be performed using a first classifier trained to use machine learning algorithms and models to perform classification and/or prediction tasks. In some embodiments of the invention, the first classifier can be trained to use the cryptographic-operation constraints and the cryptographic metrics to perform the task of predicting the non-mandatory cryptographic processing requirements of the encrypted message. In some embodiments of the invention, some or all of the predictive RS operations can be performed using a second classifier trained to use machine learning algorithms and models to perform classification and/or prediction tasks. In some embodiments of the invention, the second classifier can be trained to use the cryptographic processing requirements predicted by the first classifier, along with descriptions of the functional capabilities of the suite of available cryptographic computing resources, to perform the task of identifying the customized set of cryptographic computing resources (taken from among the suite of available cryptographic computing resources) that match or satisfy (without undue waste of cryptographic computing resources) the predicted cryptographic processing requirements.

In accordance with aspects of the invention, the encrypted message can be implemented as a resource-scaling envelope (RS-EVP) data extension. In the OSS, an envelope is a symmetric key that has been encrypted with a public key. Because encryption and decryption with symmetric keys is computationally expensive, messages are not encrypted directly with such keys but are instead encrypted using a symmetric "session" key, and this key is itself then encrypted using the public key. This combination of a symmetric session key encrypted with a public key is referred to in the OSS as an envelope.

Technical effects and benefits provided by the embodiments of the invention described herein include segmenting out any mandatory cryptographic resource requirements to ensure that the mandatory requirements are applied properly because mandatory cryptographic resource requirements are typically applied to encrypted messages with higher security levels that require more secure cryptographic resources. By segmenting out the messages with mandatory cryptographic resource requirements, the remaining message types can be more efficiently matched with the cryptographic computing resources they need. By using both cryptographic constraints and cryptographic metrics to match the remaining message types to the cryptographic computing resources they need, the actual historical performance of the cryptographic hardware can be leveraged to improve this matching operation.

Technical effects and benefits provided by the embodiments of the invention described herein further include allowing existing open-source software to be efficiently modified to incorporate features and functionality of the various embodiments of the invention.

Technical effects and benefits provided by the embodiments of the invention described herein further include allowing the computer-implemented method to accumulate data from each iteration of the computer-implemented method and using the accumulation data to improve subsequent iterations of the computer-implemented method.

Turning now to a more detailed description of aspects of the invention, FIG. 1 depicts an RS-OS-COF system 100 in accordance with embodiments of the invention. As shown, the system 100 includes an external entity 110 in communication with an application pod 120 over a wired or wireless network connection 112. The external entity 110 can be any communications element capable of transmitting over the network connection 112 an encrypted message such as the HTTPS message 114 having RS Data 116. The application node 120 includes one or more nodes 130, wherein at least one of the nodes includes an RS engine 140 in accordance with aspects of the invention. The node(s) 130 are configured to utilize the OSS 160, the RS data 116, and the crypto-metrics 170 to cognitively select one or more of the set of available cryptographic computing resources 180 (i.e., one or more of CCR-A 182A, CCR-B 182B, CCR-C 182C, CCR-D 182D); use the selected ones of the set of cryptographic computing resources 180 to apply customized cryptographic operations to the HTTPS message 114 in order to generate the decrypted or unpacked HTPP message 131; and send the decrypted HTTP message 131 to an application container 150 for downstream processing.

Figure 2:
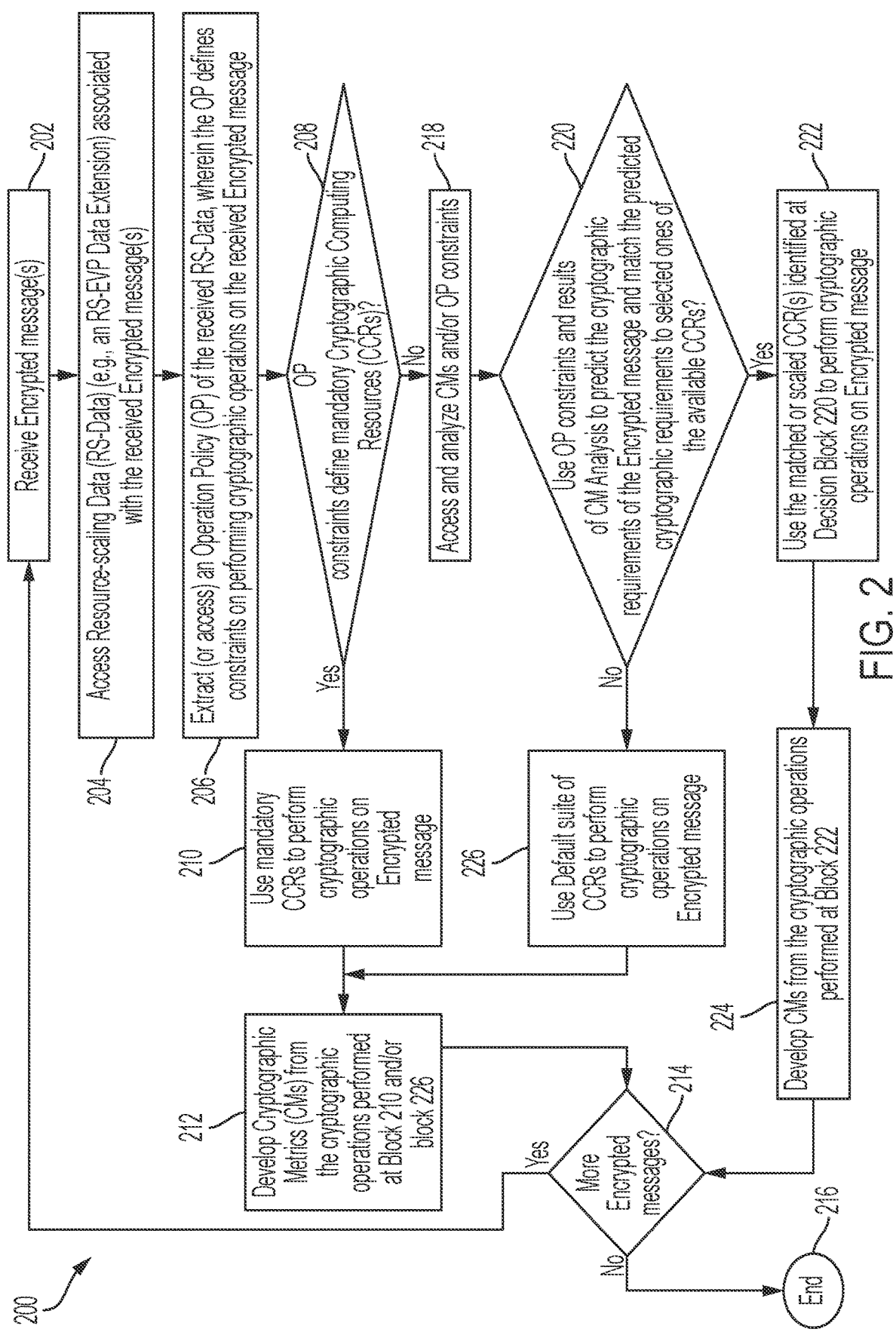
FIG. 2 depicts a flow diagram illustrating a computer-implemented method embodying aspects of the invention.

FIG. 2 depicts a computer-implemented method 200 in accordance with aspects of the invention. The method 200 is performed by the RS-OS-COF system 100 (shown in FIG. 1). Where appropriate, the description of the method 200 will make reference to the corresponding elements of the system 100 shown in FIG. 1. In accordance with aspects of the invention, the method 200 begins at blocks 202, 204 where the application pod 120 receives an encrypted message (e.g., the HTTPS message 114) (block 202), and where the RS engine 140 accesses the RS data 116 associated with the received encrypted message (block 204). At block 206 of the method 200, the RS engine 140 extracts or accesses an operation policy (OP) of the RS data 116, wherein the OP defines OP constraints on performing cryptographic operations on the received encrypted message.

At decision block 208, the RS engine 140 determines whether or not the OP constraints define or specify that the encrypted message must be cryptographically processed using certain ones of the CCRs 180. If the answer to the inquiry at decision block 208 is yes, the method 200 moves to block 210 where the RS engine 140 selects the required one(s) of the CCRs 180 (e.g., CCR-D 182D) and uses the selected one(s) of the CCRs 180 to perform the mandated cryptographic operations on the encrypted message. From block 210, the method 200 moves to block 212 where the RS engine 140 develops cryptographic metrics (CMs) from the performance of the mandated cryptographic operations on the encrypted message. In accordance with embodiments of the invention, the CMs developed at block 212 are added to the CMs that are used at block 218 (not yet described). Accordingly, after multiple iterations of the method 200, the CMs used at block 218 have been accumulated throughout the multiple iterations of the method 200. From block 212, the method 200 moves to decision block 214 to determine whether or not additional encrypted messages are being transmitted. If the answer to the inquiry at decision block 214 is no, the methodology 200 moves to block 216 and ends. If the answer to the inquiry at decision block 214 is yes, the method 200 returns to block 202 to receive a next encrypted message.

Returning to decision block 208, if the answer to the inquiry at decision block 208 is no, the method 200 moves to block 216 where the RS engine 140 accesses and analyzes accumulated CMs and/or the OP constraints. At decision block 220, the RS engine 140 attempts to use the OP constraints and the results of a CM analysis (performed at decision block 220) to predict the cryptographic requirements of the encrypted message and match the predicted cryptographic requirements to selected ones of the available CCRs 180.

In accordance with some aspects of the invention, the operations described at decision block 220 can be performed by configuring the RS engine 140 to use a configuration of modules that collect, dispatch, analyze, and/or manage the data traffic that moves through the RS engine 140 to make the prediction of the cryptographic requirements of the encrypted message and/or match the predicted cryptographic requirements to selected ones of the available CCRs 180. In some embodiments of the invention, the configuration of modules include an algorithm handling module 420 (shown in FIG. 4), a resource management module 430 (shown in FIG. 4), and a configuration of data-traffic-related modules. In some embodiments of the invention, the data-traffic-related modules can include a traffic dispatcher module 442 (shown in FIG. 4), a traffic analyzer module 446 (shown in FIG. 4), and a traffic metrics collector module 444 (shown in FIG. 4). In embodiments of the invention, the traffic analyzer module 446 is configured to analyze the encrypted message based at least in part on dispatch principles 446A (shown in FIG. 4). Additional details of how the configuration of modules operate to implement some or all of the operations depicted in decision block 220 are provided subsequently herein.

In accordance with aspects of the invention, the operations described at decision block 220 can be performed by configuring the RS engine 140 can be configured to use a classifier 810 (shown in FIG. 8) having machine learning algorithms 812 (shown in FIG. 8) and models 816 (shown in FIG. 8) to make the prediction of the cryptographic requirements of the encrypted message and/or the match the predicted cryptographic requirements to selected ones of the available CCRs 180. In some embodiments of the invention, decision block 220 can be implemented by training a first classifier to use the cryptographic-operation constraints and the cryptographic metrics to perform the task of predicting the non-mandatory cryptographic processing requirements of the encrypted message. A second classifier can be trained to use the cryptographic processing requirements predicted by the first classifier, along with descriptions of the functional capabilities of the suite of available cryptographic computing resources, to perform the task of identifying the customized set of cryptographic computing resources (taken from among the suite of available cryptographic computing resources) that match or satisfy (without undue waste of cryptographic computing resources) the predicted cryptographic processing requirements. Additional details of how a classifier 810 can be trained and used to perform prediction and/or classification operations that can be utilized to perform the operations defined in decision block 220 are provided subsequently herein.

If the answer to the inquiry at decision block 220 is no, the method 200 moves to block 226 where the RS engine 140 selects a default set of the CCRs 180 (e.g., all non-mandatory ones of the CCRs 180) and uses the default set of the CCRs 180 to perform default cryptographic operations on the encrypted message. From block 226, the method 200 moves to block 212 where the RS engine 140 develops cryptographic metrics (CMs) from the performance of the default cryptographic operations at block 226 on the encrypted message. In accordance with embodiments of the invention, the CMs developed at block 212 are added to the CMs that are used at block 218. Accordingly, after multiple iterations of the method 200, the CMs used at block 218 have been accumulated throughout the multiple iterations of the method 200. From block 212, the method 200 moves to decision block 214 to determine whether or not additional encrypted messages are being transmitted. If the answer to the inquiry at decision block 214 is no, the methodology 200 moves to block 216 and ends. If the answer to the inquiry at decision block 214 is yes, the method 200 returns to block 202 to receive a next encrypted message.

Returning to decision block 220, if the answer to the inquiry at decision block 220 is yes, the method 200 move to block 222 where the RS engine 140 uses the matched or scaled one (s) of the CCR(s) 180 identified at decision block 220 to perform cryptographic operations on the encrypted message. From block 222, the method 200 moves to block 224 where the RS engine 140 develops CMs from the performance of the matched and/or scaled cryptographic operations on the encrypted message. In accordance with embodiments of the invention, the CMs developed at block 224 are added to the CMs that are used at block 218. From block 224, the method 200 moves to decision block 214 to determine whether or not additional encrypted messages are being transmitted. If the answer to the inquiry at decision block 214 is no, the methodology 200 moves to block 216 and ends. If the answer to the inquiry at decision block 214 is yes, the method 200 returns to block 202 to receive a next encrypted message.

Figure 3:
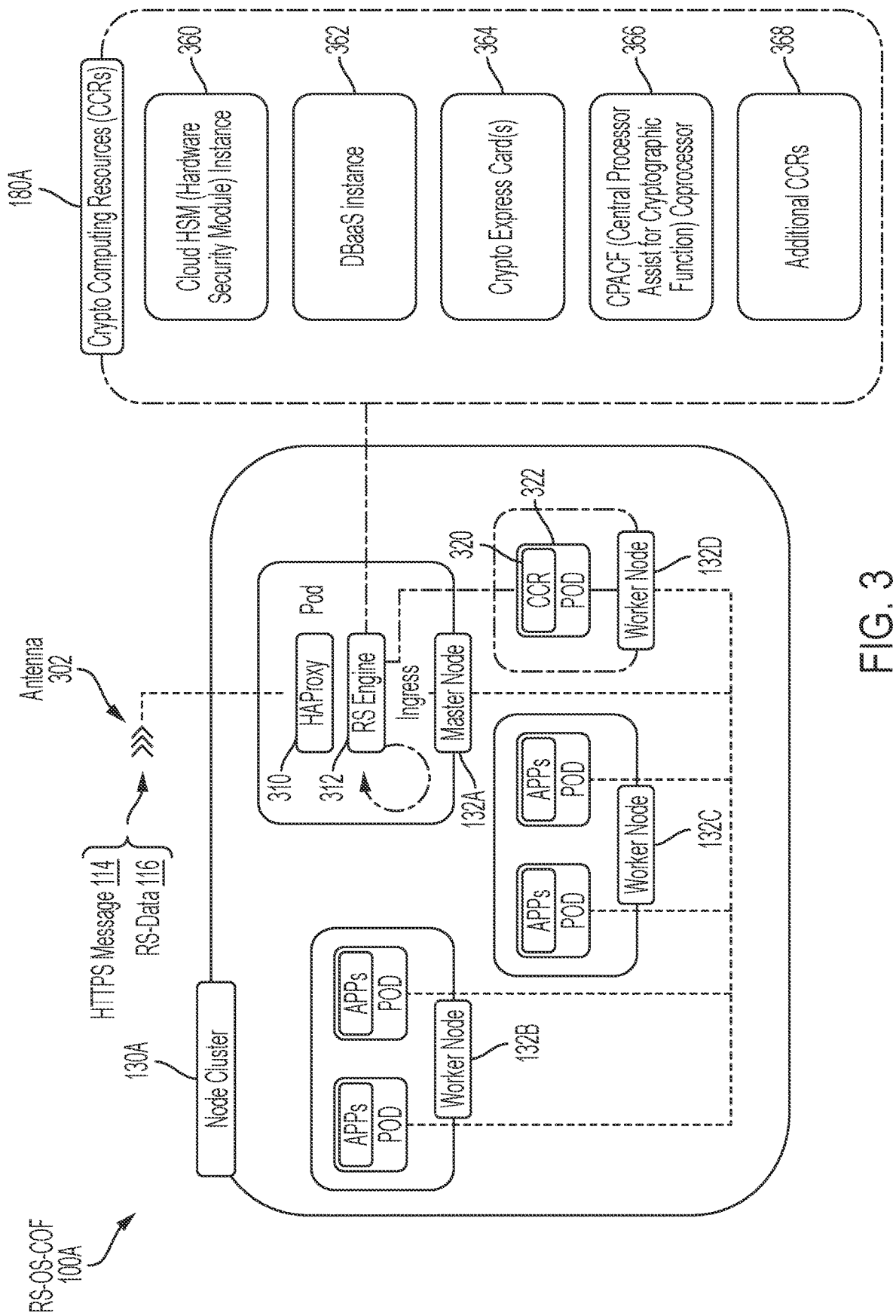
FIG. 3 depicts a diagram illustration a communications system architecture embodying aspects of the invention.

FIG. 3 depicts an RS-OS-COF system 100A in accordance with embodiments of the invention. The system 100A leverages the functional principles of the system 100 (shown in FIG. 1). However, the system 100A depicts additional details of how the functional principles shown in the system 100 can be applied in a particular computing environment. As shown in FIG. 3, the system 100A includes an external entity (not shown) in wireless communication through an antenna 302 with a node cluster 130A and a set of cryptographic computing resources (CCR) 180A. The external entity can be any communications element capable of transmitting over a wireless communication path to the antenna 302 an encrypted message such as the HTTPS message 114 having RS data 116 in accordance with aspects of the invention. The node cluster 130A includes a master node 132A and multiple worker nodes 132B, 132C, 132D, configured and arranged as shown. The master node 132A includes an application pod that houses a web-server and application programs. The web-server of the master node 132A can be implemented as an open-source HAProxy (high availability proxy) server 310. The HAProxy server 310 is configured to receive the HTTPS message 114 with RS data 116. The application programs of the master node 132A include an RS engine 312. The worker nodes 132B, 132C each include application pods and application programs, configured and arranged as shown to perform certain tasks of the node cluster 130A under the control and direction of the master node 132A. Worker node 132D is specifically designed to support the resource-scaling operations performed by the master node 132A in accordance with aspects of the invention. More specifically, the worker node 132D includes an application pod 322 that houses cryptographic computer resource (CCR) application programs 320 configured to support the resource-scaling operations (e.g., method 200 shown in FIG. 2) performed by the RS engine 312. The CCR 320 includes cryptographic resources that can be accessed and scaled in accordance with embodiments of the invention, which demonstrates that any resources can be utilized scaled using he various embodiments of the invention.

The node cluster 130A is communicatively coupled to a set or suite of cryptographic computing resources (CCR) 180A. In accordance with aspects of the invention, the RS engine 312 and the CCR application programs 320 are configured and arranged to evaluate the instructions in the RS data 116 and analyze the cryptographic metrics gathered by the node cluster 130A in order to identify and select any combination of the CCRs 180A, which can be any combination of a cloud HSM (hardware security module) 360; a DBaaS (database as a service) 362; a cryptographic express card 364; a CPACF (central processor assist for cryptographic function) coprocessor 366; and additional CCRs 368. The selected combination of CCRs 180A is customized for the particular cryptographic processing needs of the HTTPS message 114 as determined by the RS engine 312 and the CCR application programs 320.

In embodiments of the invention, the cloud HSM 360 is a dedicated cryptographic processor designed for the protection of the cryptographic key life cycle. The cloud HSM 360 is configured to generate, process, and store keys. The cloud HSM 360 can be used to build the user's own public key infrastructure to handle application and signing activities. The cloud HSM 360 protects the cryptographic infrastructure of the user by securely managing, processing, and storing cryptographic keys inside a hardened, tamper-resistant device. In embodiments of the invention, the DBaaS instance 362 is a cloud computing secondary service model and a key component of XaaS (anything as a service), which describes a general category of services related to cloud computing and remote access. XaaS recognizes the vast number of products, tools, and technologies that are now delivered to users as a service over the internet. In essence, the DBaaS instance 362 is a managed service configured to offer access to a database to be used with applications and their related data, which is a more structured approach compared to storage as a service. The DBaaS instance 362 can also include a database manager component, which controls all underlying database instances via an API. This API is accessible to the user via a management console, usually a web application, which the user can use to manage and configure the database and even provision or de-provision database instances.

In embodiments of the invention, the crypto express card(s) 364 are I/O attached cards that implement additional cryptographic functions. The crypto express card 364 is a coprocessor and can support a wider range of callable services that include secure key and clear key support for PKA decrypt, digital signature verify, and digital signature generate (including RSA and ECC variants). Alternatively, the crypto express card 364 can be configured as an accelerator to provide better throughput at the expense of supporting fewer services. In embodiments of the invention, the CPACF (central processor assist for cryptographic function) coprocessor 366 is a coprocessor that uses the DES, TDES, AES-128, AES-256, SHA-1, and SHA-256 ciphers to perform symmetric key encryption and calculate message digests in hardware. DES, TDES, AES-128, and AES-256 are used for symmetric key encryption. SHA-1 and SHA-256 are used for message digests. In embodiments of the invention, the additional CCRs 368 can include any other CCR that could be used to efficiently apply cryptographic operations to a type of HTTPS message that can be sent as the HTTPS message 114.

FIGS. 4-7 depict various aspects of an RS-OS-COF architecture 100B in accordance with embodiments of the invention. Before describing details of the RS-OS-COF architecture, definitions and descriptions of some terms used in FIGS. 4-7 will be provided. The term "traffic" describes data movements associated with the performance of cryptographic operations, which includes cryptographic requests to the cryptographic computing resources (CCR) 180A and cryptographic responses back from the cryptographic computing resources (CCR) 180A. "Response time" can be the duration that each cryptographic operation is handled. "Succeed/fail" is the result of the cryptographic operation that is currently being handled. "Succeed" indicates that the cryptographic operation has no errors and cryptographic computing resources (CCR) 180A returns a "succeed" response. crypto traffic metrics 462 contain the metrics and logs that are generated during the cryptographic operations being processing. It contains "response time," "succeed/fail," and the like.

Crypto resource pattern is the collection of "tenant profile," "constraint," "cost," "control interface,", and "ability interface." The crypto resource pattern is an input of traffic analyzer 446 for analyzing. "Static" represents the type of "tenant profile," "constraint," "cost," "control interface," and "ability interface." These do not change frequently. "Tenant profile" contains general information about the resource the tenant owns. "Constraint" has the same meaning as compliance, which means a security standard such as FIPS 140. "Cost" refers to pricing, such as the cost per algorithm; the cost per CPU/memory/machine/disk/cryptocard; and the cost per throughput. "Resource control interface" 431 uses a series of methods to control a resource, such as scaling up the resource, scaling down the resource. It can be used to increase/decreasing resources in the system. "Ability interface" 432 includes crypto methods and persistence methods. Crypto methods are cryptographic algorithms that can be used to do encryption, decryption, signing, verifying and so on. It includes but is not limited to EC methods, RSA methods, DH, Ciphers, Hash, and the like.

The resource metric collector 436 collects the metrics and logs from cryptographic computing resources while the resources are running. "Dynamic" refers to the dynamic metrics and logs data that are generated while the resource running, and it includes "current traffic workload," "historical data and trends," and "stability & reliability." "Current traffic workload" refers to the metrics and logs of the workload of the cryptographic computing resources. The workload of the resource can be, for example, idle, normal, or overload. "Historical data and trends" refers to the metrics and logs of the historical traffic workload of a cryptographic resource. "Stability & reliability" refers to the metrics and logs that can be used to evaluate stability and/or reliability of a cryptographic computing resource. If a resource is out of service frequently, the stability & reliability are bad. All the above generate metrics and logs while the resource is running, which can be collected by resource metric collector 436.

The "module" referred to in the terms "different computing module" represents one of the cryptographic computing resources (CCR) 180A. "Cost model" is a pricing-related description. For example, the traffic dispatcher 442 can dispatch the cryptographic operation to a less costly (e.g., to a customer) one of the cryptographic computing resources (CCRs) 180A.

Figure 5:
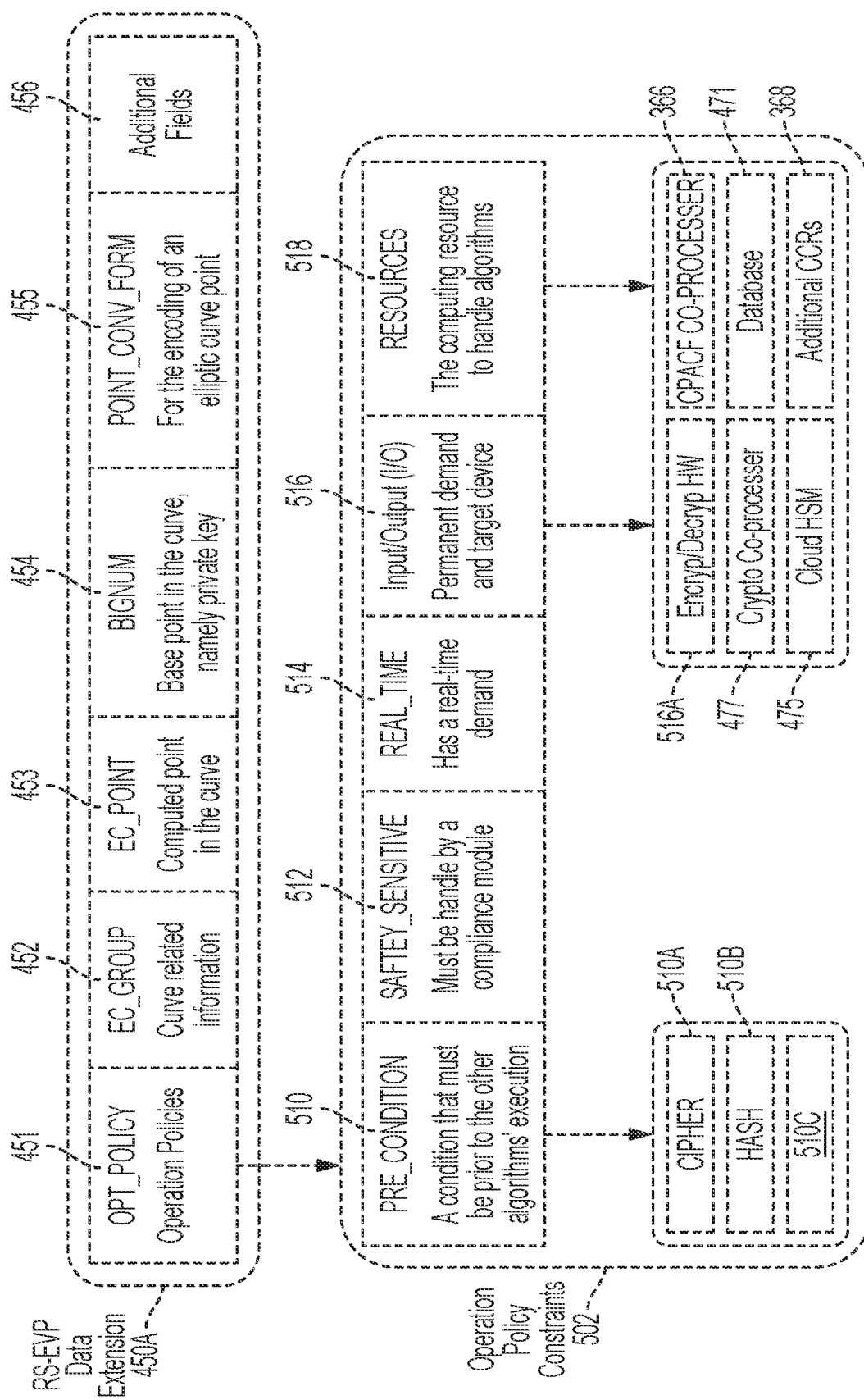
FIG. 5 depicts a diagram illustrating data fields of a resource-scaling envelope (RS-EVP) data extension in accordance with aspects of the invention.

Dispatch policy 466A is used for the traffic dispatcher module 442 to dispatch the traffic to the optimal cryptographic computing resource 320, 180A. It consists of "turning threshold," "priority-based on precondition," "cost per algorithm," "response time," "compliance resource." With an increase in the workload, when the throughput reaches a threshold, the performance of a cryptographic computing resource can drop steeply. "Turning threshold" refers to that threshold. "Priority-based on precondition" refers to a condition that must be satisfied before the other algorithm's execution. For example, as shown in FIG. 5, CIPHER 510A represents a series of symmetric encryption/decryption algorithm such as AES, DES. HASH 510B represents a series of hash algorithms such as SHA and MD5. Other algorithms include asymmetric cryptographic algorithms. In some situations, algorithm1 depends on algorithm2. For example, algorithm1 can need the outputs from algorithm3 as an input. Under this situation, algorithm2 is a PRE-CONDITION 510 of algorithm1. "Cost per Algorithm" refers to the cost (or price) per one cryptographic operation in a cryptographic computing resource. "Response time" refers to the duration of one cryptographic operation that is being handled in a cryptographic computing resource. "Compliance resource" refers to a situation where the cryptographic operation has a compliance requirement, which should be delivered to a compliance-certified cryptographic computing resource.

The term "cost" refers to the pricing, such as the cost per algorithm, the cost per CPU/memory/machine/disk/crypto-card, and/or the cost per throughput. "Cost model" refers to the pricing choice, for example, an economic preference that can impact the traffic dispatcher 442 to dispatch the traffic to the target cryptographic computing resource that has a lower price than others. An "enterprise" preference can impact the traffic dispatcher 442 to dispatch the traffic to the target cryptographic computing resource that may have a higher price but have a faster response time.

The algorithms handling module 420 and the registration module 422 have the following purpose. When a cryptographic operation (e.g., a cryptographic request) comes in with EVP data, the algorithms handling module 420 attaches an RS-EVP data extension 450 into each cryptographic operation, then sends the cryptographic operation to the traffic analyzer 446. The registration module 422 is an existing module in OpenSSL that can be utilized to register the OpenSSL Engine into OpenSSL.

The "compliance module" referenced in SAFETY-SENSITIVE 512 can be a module that meets security compliances. For example, IBM Cloud® Hyper Protect Crypto Services is a FIPS 140-2 Level 4 certified hardware security module.

The "real-time demand" referred to in REAL_TIME 514 can be a time requirement of a cryptographic operation. A cryptographic operation has a time requirement that should be handled in a short time. For example, a cryptographic operation can have a real-time demand that requires complete handling and receipt of the response message in 100 milliseconds.

I/O 516 can be a cryptographic computing resource that can store persistence data, such as like keys. I/O 516 is to emphasize the ability to keep persistence data. It can be a database 471 or a cloud HSM 475 in RESOURCES 518. However, not all of the RESOURCES 518 has the ability to keep persistence data.

The EVP request is the envelope request that is sent from OpenSSL to the engine 312A. EVP data contains parameters and functions about one algorithm. RS-EVP data extension 450 is an extension of the EVP request.

The resource control interface 431 includes consists of a series of methods to control a cryptographic computing resource, such as scaling up the resource, scaling down the resource. It can be used to increase/decrease resources in the system. Cloud scalability in cloud computing refers to the ability to increase or decrease IT resources as needed to meet changing demand. "Scale up" refers to increasing a resource into the system. "Scale down" refers to decreasing resources from the system.

The ability interface 432 includes crypto methods and persistence methods. Crypto methods are cryptographic algorithms that can be used to do encryption, decryption, signing, verifying and the like. Crypto methods include but are not limited to EC methods, RSA methods, DH, Ciphers, Hash, and the like. Persistence methods are load/store related methods, which can be used to persist data onto hardware. Persistence methods include but are not limited to load/store keys.

The information interface 433 includes a series of methods to collect information about tenant profile, constraint information, and cost information of a resource. The "tenant profile" contains general information about the cryptographic computing resource which the tenant owns. "Constraint" has the same meaning as compliance, which means some security standard such as like FIPS 140-2. "Cost" refers to the pricing, such as the cost per algorithm, the cost per CPU/memory/machine/disk/crypto-card, and/or the cost per throughput.

The discovery module 434 collects registration information from the resource control interface 431, the ability interface 432, and the information interface 433 and registers them into registers of the module 434, then delivers this information to the pusher 435.

The pusher 435 collects static data from the discovery module 434 and collects dynamic data from the resource metric collector 436, then pushes the data to the traffic analyzer 446 for analyzing. The static data includes data of the resource control interface 431, the ability interface 432, and the information interface 433. The dynamic data includes data of the current traffic workload; historical data and trends; and stability & reliability.

The resource metric collector 436 collects the metrics and logs from cryptographic computing resources during the running of the resources. "Current traffic workload" refers to the metrics and logs of the workload of the cryptographic computing resources. The workload of the cryptographic computing resource can be idle, normal, or overload. "Historical data and trends" refers to the metrics and logs of the historical traffic workload of a cryptographic computing resource. "Stability & reliability" refers to the metrics and logs that can be used to evaluate stability and/or reliability of a cryptographic computing resource. If a resource is out of service frequently, the stability & reliability are bad. All the above generate metrics and logs while the resource is running, which can be collected by resource metric collector 436.

Figure 4:
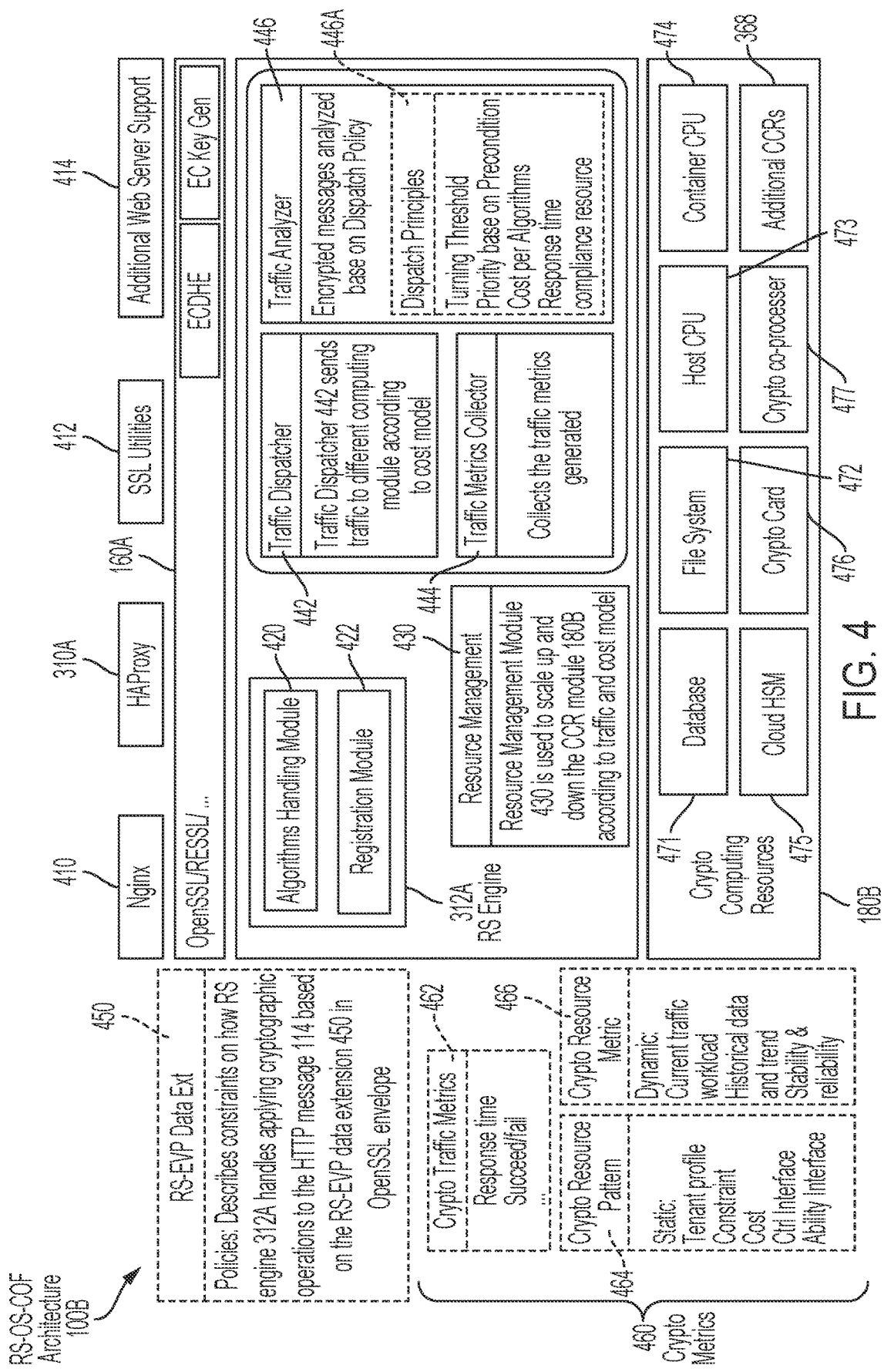
FIG. 4 depicts a system embodying aspects of the invention.

Turning now to a more detailed description of FIGS. 4-7, FIG. 4 is a block diagram that depicts the RS-OS-COF architecture 100B in accordance with aspects of the invention. The architecture 100B includes and leverages the functional principles of the system 100 (shown in FIG. 1) and the system 100A (shown in FIG. 3). However, the architecture 100B depicts additional details of how the functional principles shown in the systems 100, 100A can be applied in a particular computing environment. As shown in FIG. 4, moving from top to bottom, the first layer of the architecture 100B includes various web-servers that can be used to receive the HTTPS message 114 with RS data 116. The first layer can include an Nginx® web-server 410, an HAProxy web-server 310A, SSL utilities 412, and additional web-server support 414. The second layer of the architecture 100B includes a suite of OSS elements 160A corresponding to the OSS 160 (shown in FIG. 1). The OSS elements 160A include a variety of algorithms (e.g., ECDHE (elliptic-curve diffie-hellman ephemeral), EC key generate, and the like), which are configured and arranged to perform encryption and decryption work.

The third layer of the architecture 100B includes an RS engine 312A, a resource management module 430, a traffic dispatcher module 442, a traffic analyzer module 446, and a traffic metrics collector module 444, configured and arranged as shown. The RS engine 312A includes an algorithm handling module 420 and a registration module 422. The fourth layer of the architecture 100B includes a set or suite of cryptographic computing resources (CCR) 180B, which can include a database 471, a file system 472, a host CPU 473, a container CPU 474, a cloud HSM 475, a cryptographic card 476, a cryptographic co-processor 477, and additional CCRs 368. The database 471 and the file system 472 are the CCRs used for key storage. The cloud HSM 475, the cryptographic card 476, and the cryptographic co-processer 477 are the hardware CCRs used to perform cryptographic operations (e.g., encryption/decryption). The host CPU 473 and the container CPU 474 are the CPU resources used for cryptographic operations (e.g., encryption/decryption). The cloud HSM 475 are essentially a cryptographic card located on the cloud (e.g., cloud computing system 50 shown in FIG. 11). FIG. 4 also depicts a resource-scaling envelope (RS-EVP) data extension 450, along with cryptographic metrics 160. The cryptographic metrics 160 include cryptographic traffic metrics 462, cryptographic computing resource pattern data 464, and cryptographic computing resource metrics 466.

The RS-EVP data extension 450 include an operation policy that describes constraints on how the RS engine 312A handles the HTTP message 114 and the RS-EVP data extension 450 in the OpenSSL envelope of the OSS elements 160A. The cryptographic traffic metric includes response times, succeed instances, fail instances, and other metrics related to data traffic through the architecture 100B when performing cryptographic operations. The cryptographic computing resource pattern 464 is static data defining a variety of parameters including, for example, tenant profile, constraints, cost, the control interface, and the ability interface. The cryptographic computing resource metric 466 is dynamic data defining a variety of dynamically changing data such as current traffic, workload, historical data, historical trends, stability, and reliability.

The resource management module 430 is used to scale up and down the CCR module 180B according to traffic model and/or the cost model. The traffic dispatcher 442 sends traffic to different computing modules according to the cost model. The traffic metrics collector module collects traffic metrics generated by the architecture 100B based on the architecture performing the resource-scaling operations described herein (e.g., method 200 shown in FIG. 2). The traffic analyzer module 446 analyzes encrypted messages (e.g., HTTPS message 114) based on the dispatch policy, which defines policies such as the turning threshold, priority based on precondition, cost per algorithm, response time, and compliance resources. The traffic dispatcher 442, the traffic metrics collector 444, the traffic analyzer 446, and the resource management 430 reside in the master Node 132A. In some embodiments of the invention, the elements can either reside in RS Engine 312 or can be in the same layer with RS Engine 312 from an architecture perspective.

FIG. 5 depicts a block diagram showing an RS-EVP data extension 450A according to embodiments of the invention. The RS-EVP data extension 450A corresponds to the RS-EVP data extension 450 (shown in FIG. 4), however the RS-EVP data extension 450A provides additional details of how the fields that define an operation policy and operation policy constraints can be implemented in some embodiments of the invention. As shown in FIG. 5, the RS-EVP data extension 450A has multiple fields, including OPT_POLICY 451 (operation policies), EC_GROUP 452 (curve related information), EC_POINT 453 (computed point in the curve), BIGNUM 454 (base point in the curve, namely the private key), POINT_CONV_FORM 455 (for the encoding of an elliptic curve point), and additional fields 456.

The OPT_POLICY 451 defines operation policy constraints 502. The operation policy constraints 502 include PRE-CONDITION 510 (a condition that must be satisfied prior to the execution of other algorithms), SAFETY_SENSITIVE 512 (must be handled by a compliance module), REAL_TIME 514 (the HTTPS message 114 has a real-time demand), I/O 516 (permanent demand and target device), and RESOURCES 518 (mandates the CCRs that must be used to perform cryptographic operations on the HTTPS message 114). The CIPHER 510A, HASH 510B, and additional precondition 510C are examples of what the PRE-CONDITION 510 can define. The encryption/decryption hardware 516A, the cryptographic coprocessor 477, the cloud HSM 475, the CPACF coprocessor 366, the database 471, and the additional CCRs 368 are examples of mandatory CCRs that can be called out the I/O 516 and/or the RESOURCES 518. As described in greater detail subsequently herein, if the I/O 516 and RESOURCES 518 identify mandatory CCRs, the traffic analyzer 446 sends the HTTPS message 114 to the traffic dispatcher 442 to dispatch to the target CCRs. If the I/O 516 and RESOURCES 518 do not identify mandatory CCRs, the traffic analyzer 446 assess the HTTPS message 114, the OPT_POLICY 451, and the cryptographic metrics 460 to predict and/or determine the cryptographic requirements of the HTTPS message 114 then recommend a combination of the CCRs 180A that match the predicted and/or determined cryptographic requirements of the HTTPS message 114.

Figure 6:
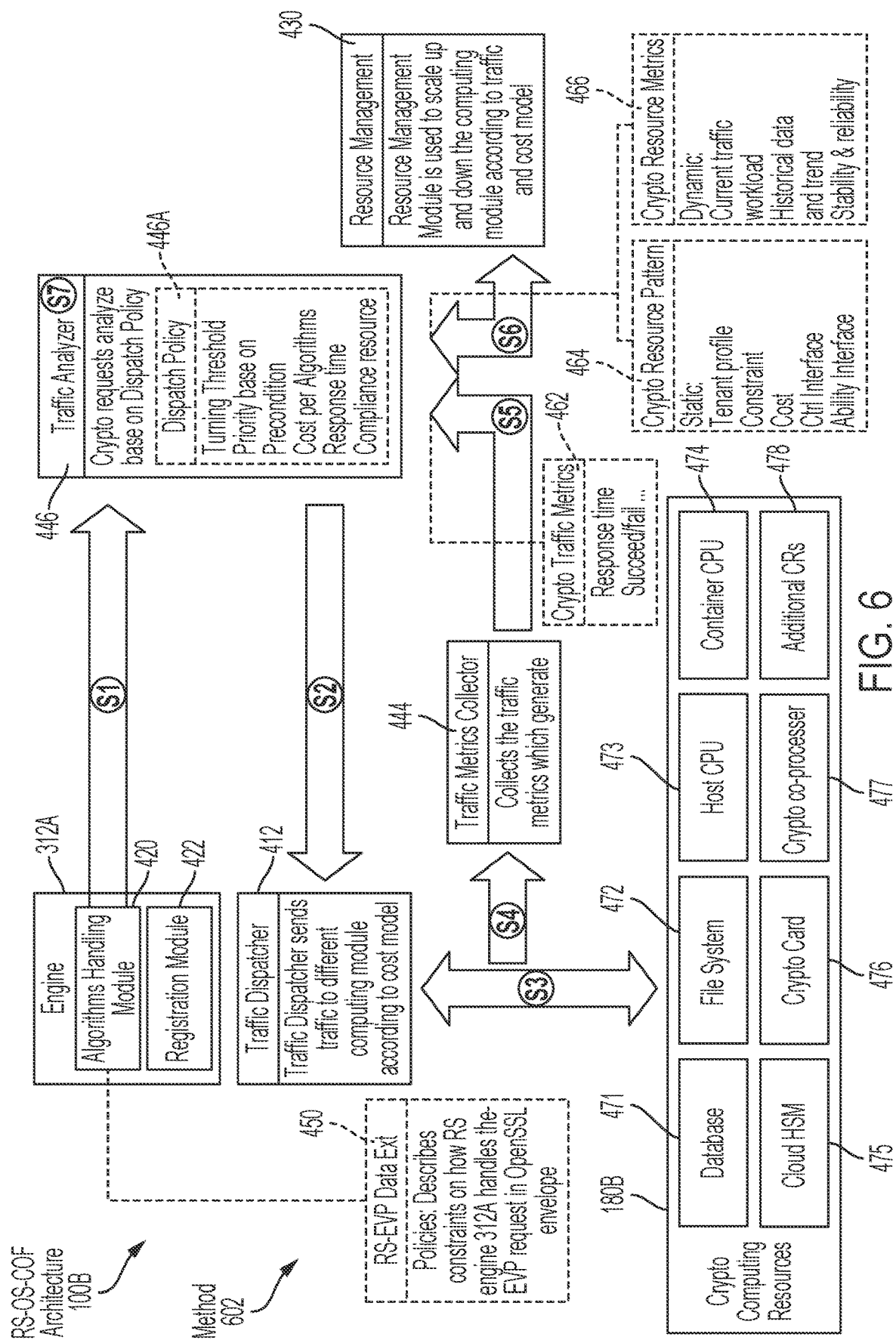
FIG. 6 depicts a diagram illustrating both a system and a methodology in accordance with aspects of the invention.

FIG. 6 depicts a diagram illustrating both the architecture 100B and a methodology 602 performed by the architecture 100B in accordance with aspects of the invention. In general, the traffic metrics collector 444 collects the cryptographic traffic metrics 462 and sends it to the traffic analyzer 446 to generate cryptographic computing resource pattern 462 to instruct the traffic dispatcher 442 to dispatch traffic to different computing modules. The cryptographic traffic metrics 444 include a user level metric that represents the user level an encryption request being associated; a performance metric that represents the performance of the HTTPS message 114, for example, its response time, CPU usage, memory cost, network usage, etc.; a security level metric of the resources being accessed which represents the security level of the resources being accessed; a succeed/fail metric which represents historical success rate of an encryption service; and an access frequency metric which represent access frequency of an encryption service, etc. Under the guidance from the traffic analyzer 446, the traffic dispatcher 442 sends traffic to different computing module according to cost model.

The inputs to the cryptographic traffic analyzer 446 include cryptographic traffic metrics from cryptographic traffic metrics collector 444; the RS-EVP data extension 450, 450A from the algorithms handling module 420; and the cryptographic computing resource pattern/metric from the resource management module 430. The outputs of the cryptographic traffic analyzer 446 include the dispatch policy, which includes turning threshold; priority base on precondition; cost per algorithms call; response time; and compliance resource.

The method 602 will now be described in the context of how steps S1-S7 can proceed in a first example. In S1, the algorithms handling module 420 sends a ECDHE request to the traffic analyzer 446 with the RS-EVP data extension 450. The value of I/O 516 in the RS-EVP data extension 450A is "impermanence." The value of the RESOURCES 518 variable in the RS-EVP data extension 450A Ext is the container CPU 474, which is fixed. In S2, the traffic analyzer module 446 receives this request generated at S1 and finds that the resource has a mandatory resource, so there is no need to do more analysis and the request is just sent to the traffic dispatcher module 442. In S3, the traffic dispatcher module 442 dispatches the request to the container CPU 474 of the CCR 180B. In S4, the traffic metric collector module 444 collects information of the cryptographic metrics 160, which includes performance metrics, success rate metrics, access frequency metrics of the container CPU 474, and the like. In S5, the traffic metric collector 444 pushes the collected cryptographic metrics to the traffic analyzer 446. In S6, the resource management module 430 pushes to the traffic analyzer 446 the cryptographic metrics 160 related to the execution of cryptographic operations by the container CPU 474. In S7, the traffic analyzer 446 generates the dispatch policy 446A based on inputs from S1, S4, and S6 and uses the dispatch policy 446A for further cryptographic request dispatch. The traffic analyzer 446 utilizes the interface provided by resource management module 430 to scale up and/or scale down the CCRs 180B to match the cryptographic operations required by the HTTPS message 114.

The method 602 will now be described in the context of how steps S1-S7 can proceed in a second example. In S1, the algorithms handling module 420 sends an EC Key Gen request to the traffic analyzer 446 with the RS-EVP data extension 450. The value of I/O 516 in the RS-EVP data extension 450A is "permanence." The value of the RESOURCES 518 variable in the RS-EVP data extension 450A Ext is the cloud HSM 475, which is fixed. In S2, the traffic analyzer module 446 receives this request generated at S1 and finds that the resource has a mandatory resource, so there is no need to do more analysis and the request is just sent to the traffic dispatcher module 442. In S3, the traffic dispatcher module 442 dispatches the request to the cloud HSM 475 of the CCR 180B. In S4, the traffic metric collector module 444 collects information of the cryptographic metrics 160, which includes performance metrics, success rate metrics, access frequency metrics, and the like of the cloud HSM 475. In S5, the traffic metric collector 444 pushes the collected cryptographic metrics to the traffic analyzer 446. In S6, the resource management module 430 pushes to the traffic analyzer 446 the cryptographic metrics 160 related to the execution of cryptographic operations by the cloud HSM 475. In S7, the traffic analyzer 446 generates the dispatch policy 446A based on inputs from S1, S4, and S6 and uses the dispatch policy 446A for further cryptographic request dispatch. The traffic analyzer 446 utilizes the interface provided by resource management module 430 to scale up and/or scale down the CCRs 180B to match the cryptographic operations required by the HTTPS message 114.

Figure 7:
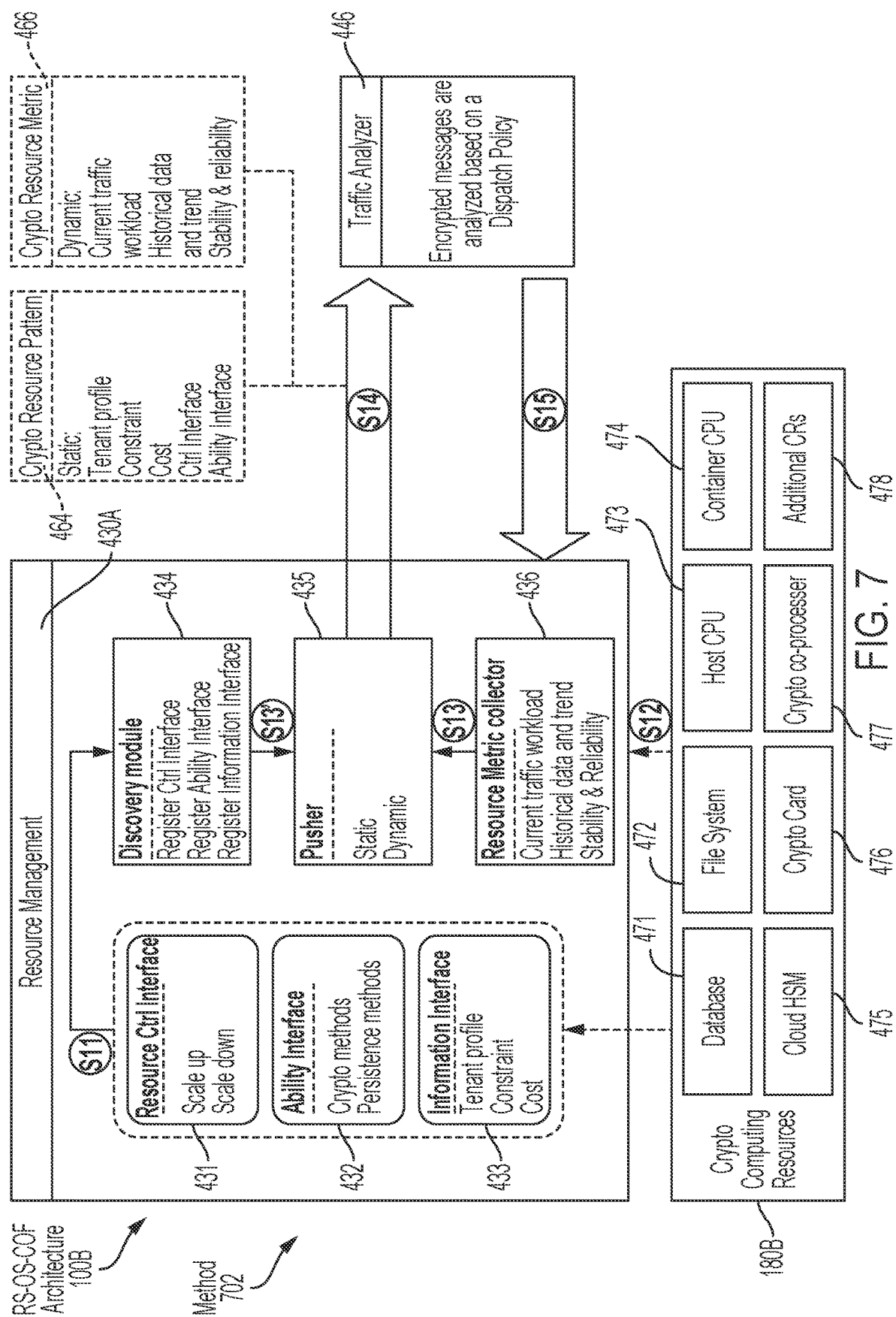
FIG. 7 depicts a diagram illustrating both a system and a methodology in accordance with aspects of the invention.

FIG. 7 depicts a diagram illustrating both a subset of the architecture 100B and a methodology 702 performed by the architecture 100B in accordance with aspects of the invention. More specifically, FIG. 7 depicts a resource management module 430A, which provides additional details about how the resource management module 430 (shown in FIG. 7) can be implemented in accordance with embodiments of the invention. As shown, the resource management module 430A includes a resource control interface 431, an ability interface 432, an information interface 433, a discovery module 434, a pusher 435, and resource metric collector 436, configured and arranged as shown.

The method 702 will now be described with reference to how steps S11-S15 would be performed by the portion of the architecture 100B shown in FIG. 7. In S11, within the resource management module 430A, the discovery module 434 receives data and information from the resource control interface 431 (scale up, scale down), the ability interface 432 (cryptographic methods, persistence methods), and the information interface 433 (tenant profile, constraint, cost). The cryptographic methods include EC methods, RSA methods, DH, Ciphers, Hash, and the like. The information interface 433 uses so-called "get" methods to retrieve resource-related information about tenant profiles, constraints, costs, and the like. In S12, the resource metric collector 436 collects dynamic metrics about current traffic workload; historical data; historical trends; and stability & reliability. In S13, the pusher 435 receives inputs from the resource metric collector 436 that result from the performance of S12. In S13', the pusher 435 receives inputs from the discovery module 434 resource metric collector 436 that result from the performance of S11. In S14, the pusher 435 pushes the cryptographic computing resource pattern 464 and the cryptographic computing resource metric 466 to the traffic analyzer module 446. The cryptographic computing resource pattern 464 is statically pushed one time. The cryptographic computing resource metric 466 is dynamically pushed periodically. In S15, the traffic analyzer 466 utilizes the resource control interface 431 to scale up and/or scale down the CCRs 180B to match the cryptographic operations required by the HTTPS message 114.

Additional details of machine learning techniques that can be used to implement aspects of the invention disclosed herein will now be provided. The various prediction and/or determination functionality of the processors described herein can be implemented using machine learning and/or natural language processing techniques. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which the clustering task groups according to those characteristics in common and which differentiate them from other groups of objects. These groups are known as "clusters."

An example of machine learning techniques that can be used to implement aspects of the invention will be described with reference to FIGS. 8 and 9. Machine learning models configured and arranged according to embodiments of the invention will be described with reference to FIG. 8. Detailed descriptions of an example computing system and network architecture capable of implementing one or more of the embodiments of the invention described herein will be provided with reference to FIG. 10.

Figure 8:
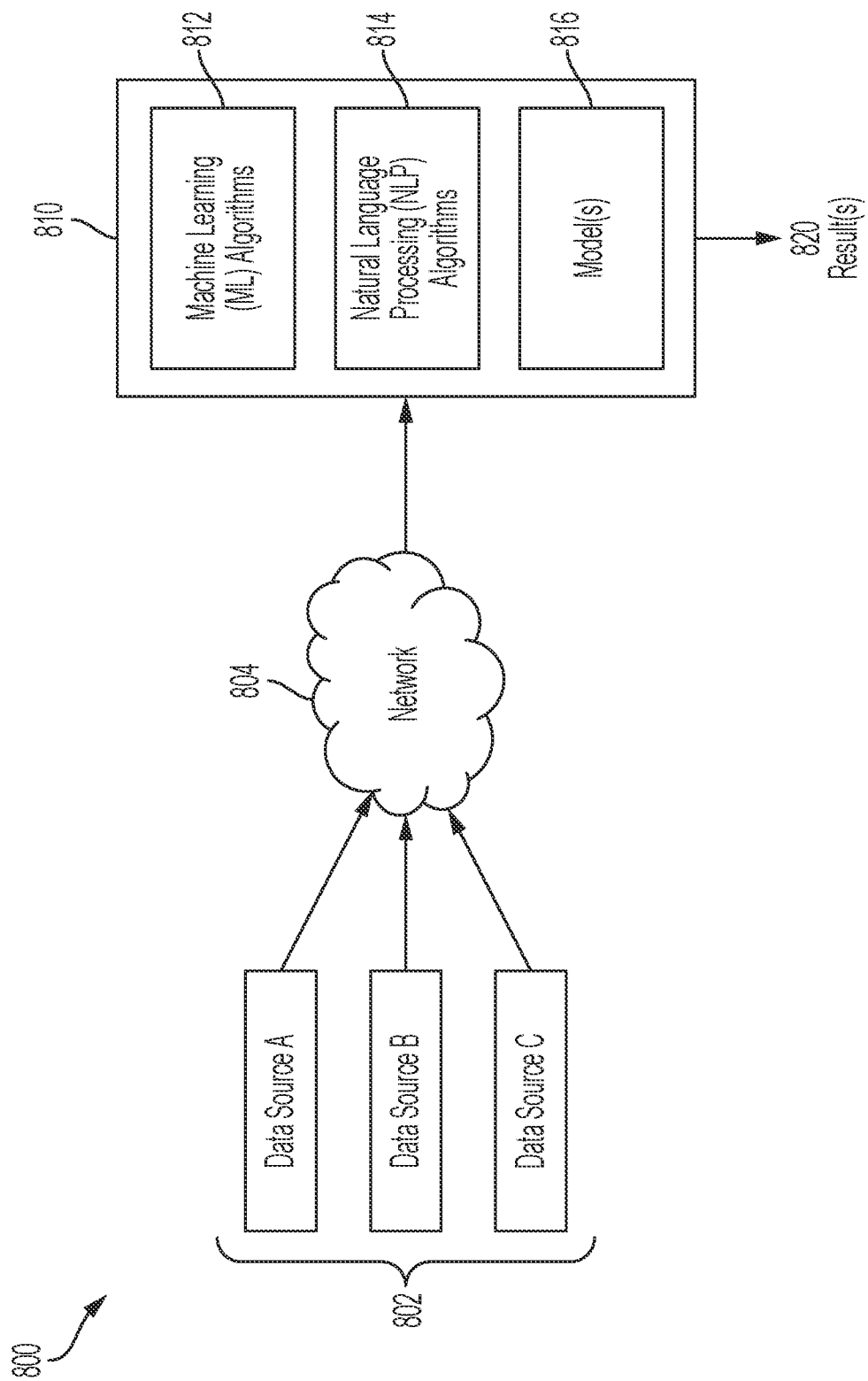
FIG. 8 depicts a machine learning system that can be utilized to implement aspects of the invention.

FIG. 8 depicts a block diagram showing a classifier system 800 capable of implementing various predicting and determining aspects of the invention described herein. More specifically, the functionality of the system 800 is used in embodiments of the invention to generate various models and/or sub-models that can be used to implement predicting and determining functionality in embodiments of the invention. The system 800 includes multiple data sources 802 in communication through a network 804 with a classifier 810. In some aspects of the invention, the data sources 802 can bypass the network 804 and feed directly into the classifier 810. The data sources 802 provide data/information inputs that will be evaluated by the classifier 810 in accordance with embodiments of the invention. The data sources 802 also provide data/information inputs that can be used by the classifier 810 to train and/or update model(s) 816 created by the classifier 810. The data sources 802 can be implemented as a wide variety of data sources, including but not limited to, sensors configured to gather real time data, data repositories (including training data repositories), and outputs from other classifiers. The network 804 can be any type of communications network, including but not limited to local networks, wide area networks, private networks, the Internet, and the like.

Figure 10:
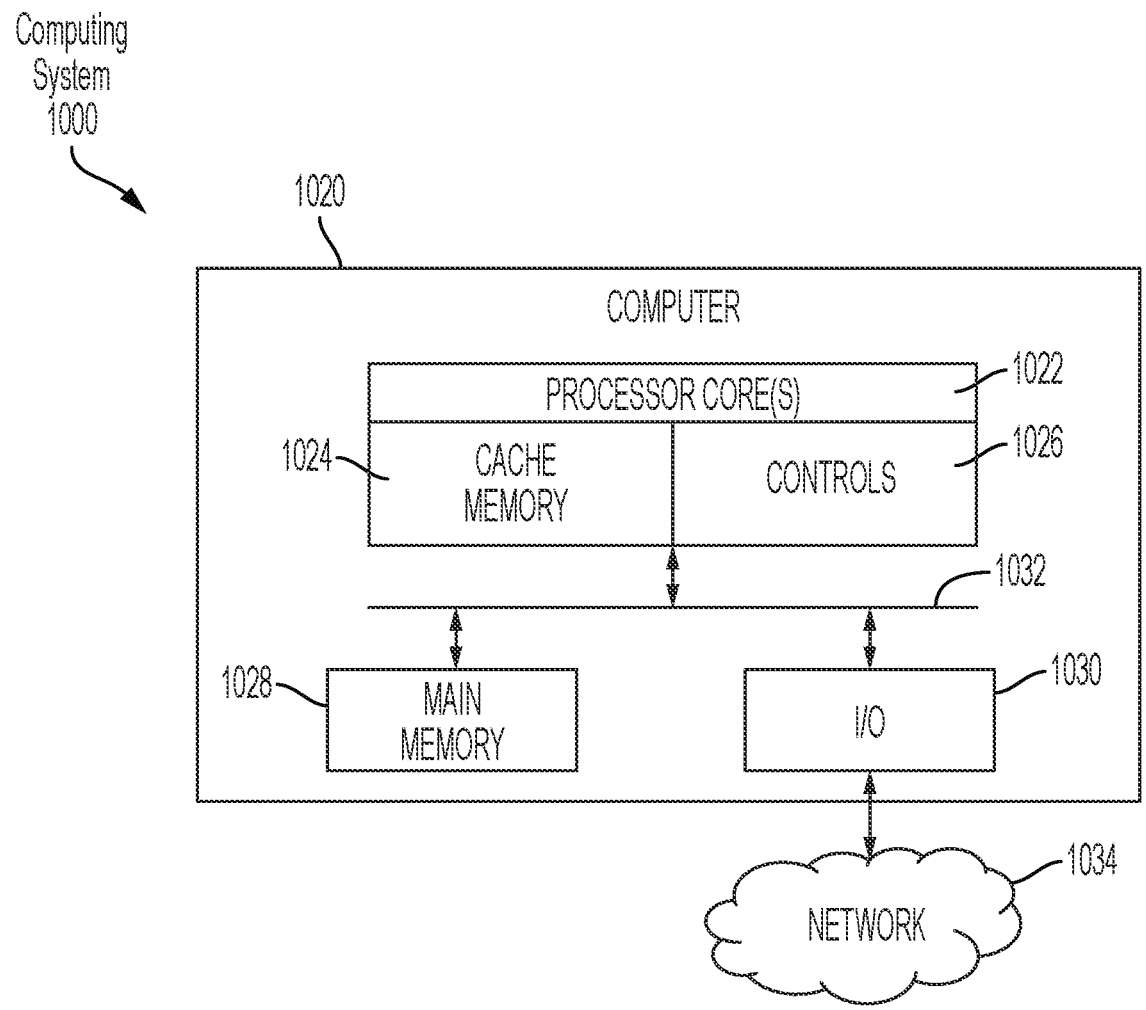
FIG. 10 depicts details of an exemplary computing system capable of implementing aspects of the invention.

The classifier 810 can be implemented as algorithms executed by a programmable computer such as a processing system 1000 (shown in FIG. 10). As shown in FIG. 8, the classifier 810 includes a suite of machine learning (ML) algorithms 812; natural language processing (NLP) algorithms 814; and model(s) 816 that are relationship (or prediction) algorithms generated (or learned) by the ML algorithms 812. The algorithms 812, 814, 816 of the classifier 810 are depicted separately for ease of illustration and explanation. In embodiments of the invention, the functions performed by the various algorithms 812, 814, 816 of the classifier 810 can be distributed differently than shown. For example, where the classifier 810 is configured to perform an overall task having sub-tasks, the suite of ML algorithms 812 can be segmented such that a portion of the ML algorithms 812 executes each sub-task and a portion of the ML algorithms 812 executes the overall task. Additionally, in some embodiments of the invention, the NLP algorithms 814 can be integrated within the ML algorithms 812.

The NLP algorithms 814 include speech recognition functionality that allows the classifier 810, and more specifically the ML algorithms 812, to receive natural language data (text and audio) and apply elements of language processing, information retrieval, and machine learning to derive meaning from the natural language inputs and potentially take action based on the derived meaning. The NLP algorithms 814 used in accordance with aspects of the invention can also include speech synthesis functionality that allows the classifier 810 to translate the result(s) 820 into natural language (text and audio) to communicate aspects of the result(s) 820 as natural language communications.

The NLP and ML algorithms 814, 812 receive and evaluate input data (i.e., training data and data-under-analysis) from the data sources 802. The ML algorithms 812 include functionality that is necessary to interpret and utilize the input data's format. For example, where the data sources 802 include image data, the ML algorithms 812 can include visual recognition software configured to interpret image data. The ML algorithms 812 apply machine learning techniques to received training data (e.g., data received from one or more of the data sources 802) in order to, over time, create/train/update one or more models 816 that model the overall task and the sub-tasks that the classifier 810 is designed to complete.

Figure 9:
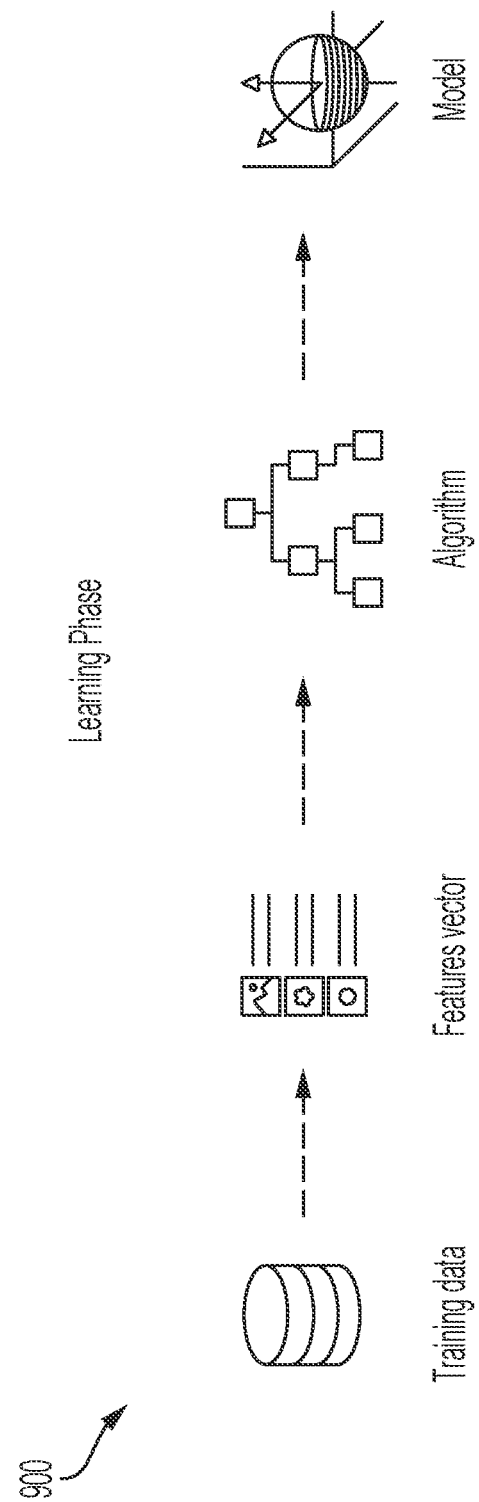
FIG. 9 depicts a learning phase that can be implemented by the machine learning system shown in FIG. 8.

Referring now to FIGS. 8 and 9 collectively, FIG. 9 depicts an example of a learning phase 900 performed by the ML algorithms 812 to generate the above-described models 816. In the learning phase 900, the classifier 810 extracts features from the training data and coverts the features to vector representations that can be recognized and analyzed by the ML algorithms 812. The features vectors are analyzed by the ML algorithm 812 to "classify" the training data against the target model (or the model's task) and uncover relationships between and among the classified training data. Examples of suitable implementations of the ML algorithms 812 include but are not limited to neural networks, support vector machines (SVMs), logistic regression, decision trees, hidden Markov Models (HMMs), etc. The learning or training performed by the ML algorithms 812 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 810 and the ML algorithms 812. Unsupervised learning can utilize additional learning/training methods including, for example, clustering, anomaly detection, neural networks, deep learning, and the like.

When the models 816 are sufficiently trained by the ML algorithms 812, the data sources 802 that generate "real world" data are accessed, and the "real world" data is applied to the models 816 to generate usable versions of the results 820. In some embodiments of the invention, the results 820 can be fed back to the classifier 810 and used by the ML algorithms 812 as additional training data for updating and/or refining the models 816.

In aspects of the invention, the ML algorithms 812 and the models 816 can be configured to apply confidence levels (CLs) to various ones of their results/determinations (including the results 820) in order to improve the overall accuracy of the particular result/determination. When the ML algorithms 812 and/or the models 816 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 810 can be configured to apply confidence levels (CLs) to the results 820. When the classifier 810 determines that a CL in the results 820 is below a predetermined threshold (TH) (i.e., CL<TH), the results 820 can be classified as sufficiently low to justify a classification of "no confidence" in the results 820. If CL>TH, the results 820 can be classified as sufficiently high to justify a determination that the results 820 are valid. Many different predetermined TH levels can be provided such that the results 820 with CL>TH can be ranked from the highest CL>TH to the lowest CL>TH.

FIG. 10 illustrates an example of a computer system 1000 that can be used to implement any of the computer-based components of the various embodiments of the invention described herein. The computer system 1000 includes an exemplary computing device ("computer") 1002 configured for performing various aspects of the content-based semantic monitoring operations described herein in accordance aspects of the invention. In addition to computer 1002, exemplary computer system 1000 includes network 1014, which connects computer 1002 to additional systems (not depicted) and can include one or more wide area networks (WANs) and/or local area networks (LANs) such as the Internet, intranet(s), and/or wireless communication network(s). Computer 1002 and additional system are in communication via network 1014, e.g., to communicate data between them.

Exemplary computer 1002 includes processor cores 1004, main memory ("memory") 1010, and input/output component(s) 1012, which are in communication via bus 1003. Processor cores 1004 includes cache memory ("cache") 1006 and controls 1008, which include branch prediction structures and associated search, hit, detect and update logic, which will be described in more detail below. Cache 1006 can include multiple cache levels (not depicted) that are on or off-chip from processor 1004. Memory 1010 can include various data stored therein, e.g., instructions, software, routines, etc., which, e.g., can be transferred to/from cache 1006 by controls 1008 for execution by processor 1004. Input/output component(s) 1012 can include one or more components that facilitate local and/or remote input/output operations to/from computer 1002, such as a display, keyboard, modem, network adapter, etc. (not depicted).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
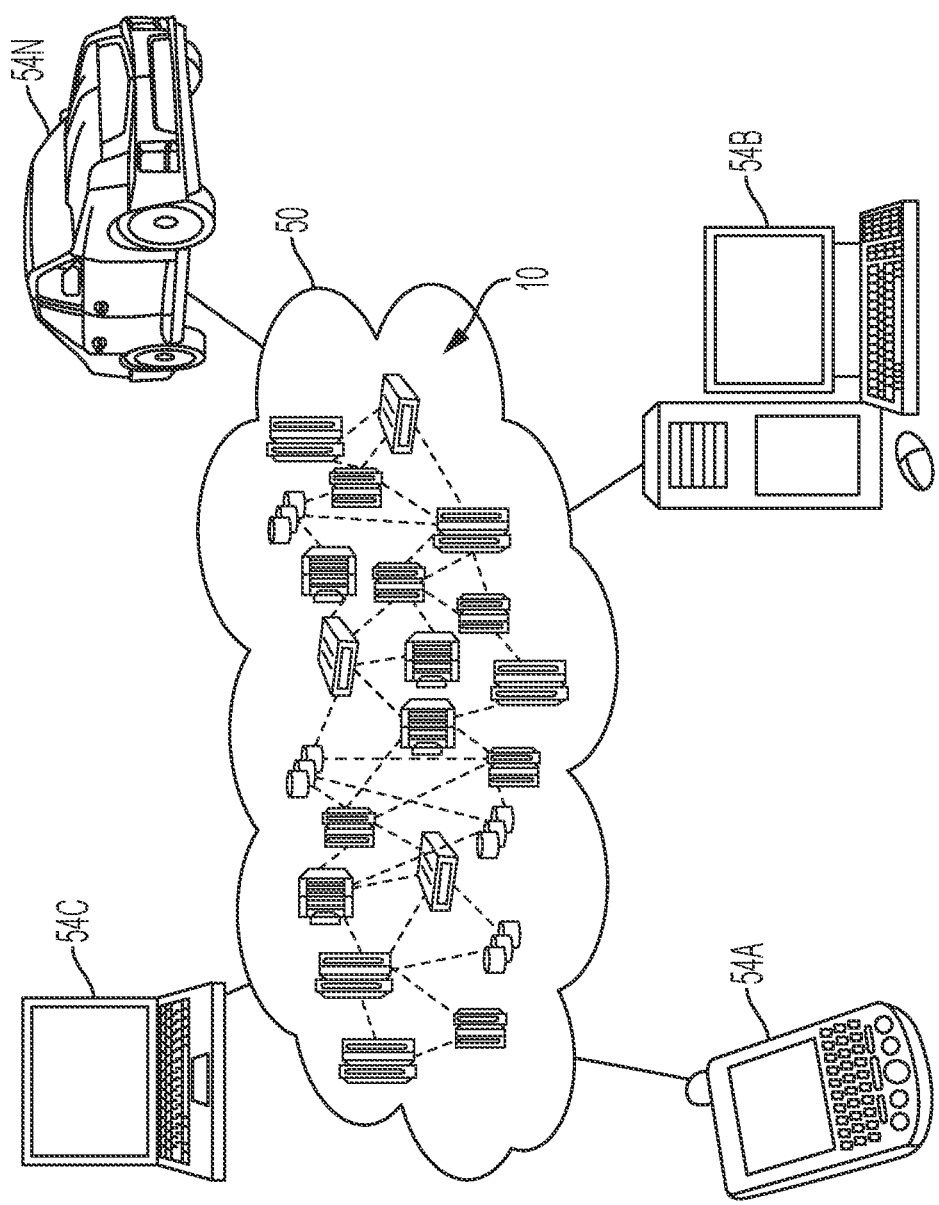
FIG. 11 depicts a cloud computing environment according to embodiments of the invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
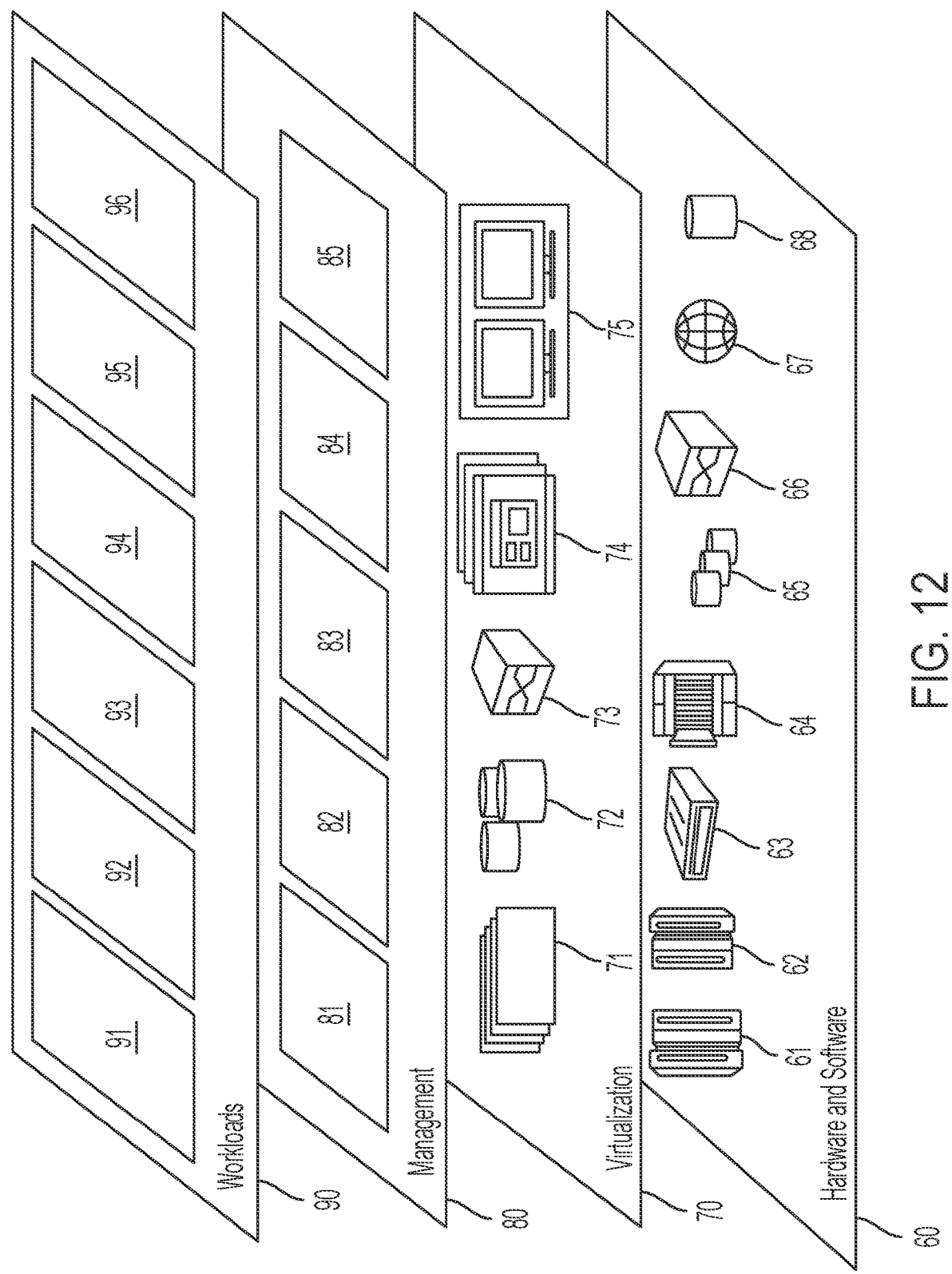
FIG. 12 depicts abstraction model layers according to an embodiment of the invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically scaling cryptographic computing resources up or down to match the cryptographic processing requirements of encrypted communications 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As previously noted herein, conventional techniques related to making and using aspects of the invention are well-known so may or may not be described in detail herein. However, to provide context, a more detailed description of various cryptography methods and definitions that can be utilized in implementing one or more embodiments of the present invention will now be provided.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, because all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption. Accordingly, public key cryptography is an asymmetric scheme that uses a pair of keys—specifically, a public key that is used to encrypt data, along with a corresponding private or secret key that is used to decrypt the data. The public key can be published to the world while the private key is kept secret.

Any entity having a copy of the public key can then encrypt information that the entity in possession of the secret/private key can decrypt and read.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message. For example, when a sender encrypts a message, the public key of the receiver is used to transform the data within the original message into the contents of the encrypted message. A sender uses a public key to encrypt data, and the receiver uses a private key to decrypt the encrypted message.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction that is trusted to sign or issue certificates for other people or entities. The CA usually has some kind of legal responsibilities for its vouching of the binding between a public key and its owner that allow one to trust the entity that signed a certificate. There are many such certificate authorities, and they are responsible for verifying the identity and key ownership of an entity when issuing the certificate.

If a certificate authority issues a certificate for an entity, the entity provides a public key and some information about the entity. A software tool, such as specially equipped web browsers, can digitally sign this information and send it to the certificate authority. The certificate authority might be a company or other entity that provides trusted third-party certificate authority services. The certificate authority will then generate the certificate and return it. The certificate can contain other information, such as dates during which the certificate is valid and a serial number. One part of the value provided by a certificate authority is to serve as a neutral and trusted introduction service, based in part on their verification requirements, which are openly published in their certification service practices (CSP).

Typically, after the CA has received a request for a new digital certificate, which contains the requesting entity's public key, the CA signs the requesting entity's public key with the CA's private key and places the signed public key within the digital certificate. Anyone who receives the digital certificate during a transaction or communication can then use the public key of the CA to verify the signed public key within the certificate. The intention is that an entity's certificate verifies that the entity owns a particular public key. There are several standards that define the information within a certificate and describe the data format of that information.

The terms "cryptography," "cryptosystems," "encryption," and equivalents thereof are used herein to describe secure information and communication techniques derived from mathematical concepts, including, for example, rule-based calculations called algorithms configured to transform messages in ways that are hard to decipher without authorization. Cryptography uses a set of procedures known as cryptographic algorithms, encryption algorithms, or ciphers, to encrypt and decrypt messages in order to secure communications among computer systems and applications. A cryptography suite can use a first algorithm for encryption, a second algorithm for message authentication, and a third algorithm for key exchange. Cryptographic algorithms, which can be embedded in protocols and written in software that runs on operating systems and networked computer systems, involve public and private key generation for data encryption/decryption; digital signing and verification for message authentication; and key exchange operations.

The terms "asymmetric-key encryption algorithm" and equivalents thereof are used herein to describe public-key or asymmetric-key algorithms that use a pair of keys, a public key associated with the creator/sender for encrypting messages and a private key that only the originator knows for decrypting that information.

The term "key" and equivalents thereof are used herein to describe a random string of bits created explicitly for scrambling and unscrambling data. Keys are designed with algorithms intended to ensure that every key is unpredictable and unique. The longer the key built in this manner, the harder it is to crack the encryption code. A key can be used to encrypt, decrypt, or carry out both functions based on the sort of encryption software used.

The terms "private key" and equivalents thereof are used herein to describe a key that is paired with a public key to set off algorithms for text encryption and decryption. A private key is created as part of public key cryptography during asymmetric-key encryption and used to decrypt and transform a message to a readable format. Public and private keys are paired for secure communication. A private key is shared only with the key's initiator, ensuring security. For example, A and B represent a message sender and message recipient, respectively. Each has its own pair of public and private keys. A, the message initiator or sender, sends a message to B. A's message is encrypted with B's public key, while B uses its private key to decrypt A's received message. A digital signature, or digital certificate, is used to ensure that A is the original message sender. To verify this, B uses the following steps: B uses A's public key to decrypt the digital signature, as A must previously use its private key to encrypt the digital signature or certificate; and, if readable, the digital signature is authenticated with a certification authority (CA). Thus, sending encrypted messages requires that the sender use the recipient's public key and its own private key for encryption of the digital certificate. Thus, the recipient uses its own private key for message decryption, whereas the sender's public key is used for digital certificate decryption.

The terms "public key" and equivalents thereof are used herein to describe a type of encryption key that is created in public key encryption cryptography that uses asymmetric-key encryption algorithms. Public keys are used to convert a message into an unreadable format. Decryption is carried out using a different, but matching, private key. Public and private keys are paired to enable secure communication.

The terms "digital signature" and equivalents thereof are used herein to describe techniques that incorporate public-key cryptography methodologies to allow consumers of digitally signed data to validate that the data has not been changed, deleted or added. In an example digital signature technique/configuration, a "signer" hashes the record data and encrypts the hash with the signer's private key. The encrypted hash is the signature. The consumer of the record data can hash the same record data, and then use the public key to decrypt the signature and obtain the signer's hash. A consumer attempting to validate a record can compare the consumer's hash with the signer's hash. When the two hash values match, the data content and source(s) of the record are verified.

The terms "elliptic curve cryptography" (ECC) describes algorithms that use the mathematical properties of elliptic curves to produce public key cryptographic systems. Like all public-key cryptography, ECC is based on mathematical functions that are simple to compute in one direction but very difficult to reverse. In the case of ECC, this difficulty resides in the infeasibility of computing the discrete logarithm of a random elliptic curve element with respect to a publicly known base point, or the "elliptic curve discrete logarithm problem" (ECDLP). The elliptic curve digital signature algorithm (ECDSA) is a widely-used signing algorithm for public key cryptography that uses EC.

Coprocessors are supplementary processors that take over the responsibility for performing selected processor-intensive tasks of an associated central processing unit (CPU) in order to allow the CPU to focus its computing resources on tasks that are essential to the overall system. A coprocessor's tasks can include input/output (I/O) interfacing, encryption, string processing, floating-point arithmetic, signal processing, and the like. Coprocessors can include one or more embedded systems (ES). An ES is a computer system that performs one or more dedicated functions within a larger mechanical and/or electronic system. An example of an ES is a bootstrap loader (or boot loader), which serves as a mediator between the computer's hardware and the operating system. In some computer configurations, the coprocessor itself can be considered an embedded system.

The terminology used herein is for the purpose of describing particular embodiments only and is not intended to be limiting of the invention. As used herein, unless the context clearly indicates otherwise, the singular forms "a", "an" and "the" are intended to include the plural forms. The terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially" and equivalents thereof are intended to include the degree of error associated with measurement of the particular quantity based upon the equipment available at the time of filing the application. For example, "about," "substantially" and equivalents thereof can include a range of ±8% or 5%, or 2% of a given value.

While the present invention has been described in detail in connection with only a limited number of embodiments, it should be readily understood that the present invention is not limited to such disclosed embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description but is only limited by the scope of the appended claims.

What is claimed is:

1. A computer-implemented method for performing cryptographic operations, the computer-implemented method comprising:
   receiving, using a processor system, resource-scaling (RS) data associated with an encrypted message
   accessing, using the processor system, an operation policy (OP) of the RS data, wherein the OP defines cryptographic-operation constraints;
   based at least in part on a determination that the cryptographic-operation constraints do not include mandatory cryptographic resource requirements, performing first resource-scaling operations comprising:
      using the processor system to perform an analysis of cryptographic metrics associated with the processor system;
      wherein the cryptographic metrics comprise:
         information associated with the encrypted message; and
         performance measurements of cryptographic operations performed by the processor system;
      using the cryptographic-operation constraints and results of the analysis of the cryptographic metrics to:
         determine cryptographic processing requirements of the encrypted message; and
         match the cryptographic processing requirements to selected ones of a set of available cryptographic computing resources to identify a customized set of cryptographic computing resources that have been selected to match the cryptographic processing requirements of the encrypted message; and
      using the customized set of cryptographic computing resources to perform customized cryptographic operations on the encrypted message.

2. The computer-implemented method of claim 1 further comprising:
   based at least in part on a determination that the cryptographic-operation constraints include the mandatory cryptographic computing resource requirements, performing second resource-scaling operations comprising:
      routing the encrypted message to a set of mandatory cryptographic computing resources identified by the mandatory cryptographic computing resource requirements; and
      using the set of mandatory cryptographic computing resources to perform mandatory cryptographic operations on the encrypted message.

3. The computer-implemented method of claim 1 further comprising configuring open-source cryptographic software to:
   receive a request to perform cryptographic operations on the encrypted message; and
   route the request to the processor system instead of performing the request.

4. The computer-implemented method of claim 3, wherein the open-source cryptographic software comprises open-source secure sockets layer (SSL) software.

5. The computer-implemented method of claim 1, wherein:
   the first resource-scaling operations further comprise capturing a first set of updated cryptographic metrics that result from using the customized set of cryptographic computing resources to perform the customized cryptographic operations on the encrypted message; and
updating the cryptographic metrics with the first set of updated cryptographic metrics.

6. The computer-implemented method of claim 2, wherein:
the first resource-scaling operations further comprise:
capturing a first set of updated cryptographic metrics that result from using the customized set of cryptographic computing resources to perform the customized cryptographic operations on the encrypted message; and
updating the cryptographic metrics with the first set of updated cryptographic metrics; and
the second resource-scaling operations further comprise:
capturing a second set of updated cryptographic metrics that result from using the set of mandatory cryptographic computing resources to perform mandatory cryptographic operations on the encrypted message; and
updating the cryptographic metrics with the second set of updated cryptographic metrics.

7. The computer-implemented method of claim 1, wherein: the processor system comprises a predictive model trained to utilize machine learning algorithms to determine the cryptographic processing requirements of the encrypted message
the information associated with the encrypted message includes cryptographic computing resource patterns comprising static data; and
the performance measurements include cryptographic metrics comprising dynamic data that changes.

8. A computer system comprising a memory communicatively coupled to a processor system, wherein the processor system is configured to perform processor system operations comprising:
receiving resource-scaling (RS) data associated with an encrypted message;
accessing an operation policy (OP) of the RS data, wherein the OP defines cryptographic-operation constraints;
based at least in part on a determination that the cryptographic-operation constraints do not include mandatory cryptographic computing resource requirements, performing first resource-scaling operations comprising:
an analysis of cryptographic metrics associated with the processor system;
wherein the cryptographic metrics comprise:
information associated with the encrypted message; and
performance measurements of cryptographic operations performed by the processor system;
using the cryptographic-operation constraints and results of the analysis of the cryptographic metrics to:
determine cryptographic processing requirements of the encrypted message; and
match the cryptographic processing requirements to selected ones of a set of available cryptographic computing resources to identify a customized set of cryptographic computing resources that have been selected to match the cryptographic processing requirements of the encrypted message; and
using the customized set of cryptographic computing resources to perform customized cryptographic operations on the encrypted message.

9. The computer system of claim 8, wherein the processor system is configured to perform processor system operations further comprising:
based at least in part on a determination that the cryptographic-operation constraints include the mandatory cryptographic computing resource requirements, performing second resource-scaling operations comprising:
routing the encrypted message to a set of mandatory cryptographic computing resources identified by the mandatory cryptographic computing resource requirements; and
using the set of mandatory cryptographic computing resources to perform mandatory cryptographic operations on the encrypted message.

10. The computer system of claim 8, wherein the processor system is configured to perform processor system operations further comprising configuring open-source cryptographic software to:
receive a request to perform cryptographic operations on the encrypted message; and
route the request to the processor system instead of performing the request.

11. The computer system of claim 10, wherein the open-source cryptographic software comprises open-source secure sockets layer (SSL) software.

12. The computer system of claim 8, wherein:
the first resource-scaling operations further comprise capturing a first set of updated cryptographic metrics that result from using the customized set of cryptographic computing resources to perform the customized cryptographic operations on the encrypted message; and
updating the cryptographic metrics with the first set of updated cryptographic metrics.

13. The computer system of claim 9, wherein:
the first resource-scaling operations further comprise:
capturing a first set of updated cryptographic metrics that result from using the customized set of cryptographic computing resources to perform the customized cryptographic operations on the encrypted message; and
updating the cryptographic metrics with the first set of updated cryptographic metrics; and
the second resource-scaling operations further comprise:
capturing a second set of updated cryptographic metrics that result from using the set of mandatory cryptographic computing resources to perform mandatory cryptographic operations on the encrypted message; and
updating the cryptographic metrics with the second set of updated cryptographic metrics.

14. The computer system of claim 8, wherein: the processor system comprises a predictive model trained to utilize machine learning algorithms to determine the cryptographic processing requirements of the encrypted message;
the information associated with the encrypted message includes cryptographic computing resource patterns comprising static data; and
the performance measurements include cryptographic metrics comprising dynamic data that changes.

15. A computer program product for performing cryptographic operations, the computer program product comprising a computer readable program stored on a computer readable storage medium, wherein the computer readable program, when executed on a processor system, causes the processor system to perform a processor system method comprising:

receiving resource-scaling (RS) data associated with an encrypted message;

accessing an operation policy (OP) of the RS data, wherein the OP defines cryptographic-operation constraints;

based at least in part on a determination that the cryptographic-operation constraints do not include mandatory cryptographic computing resource requirements, performing first resource-scaling operations comprising:

an analysis of cryptographic metrics associated with the processor system;

wherein the cryptographic metrics comprise:
information associated with the encrypted message; and performance measurements of cryptographic operations performed by the processor system;

using the cryptographic-operation constraints and results of the analysis of the cryptographic metrics to:

determine cryptographic processing requirements of the encrypted message; and match the cryptographic processing requirements to selected ones of a set of available cryptographic computing resources to identify a customized set of cryptographic computing resources that have been selected to match the cryptographic processing requirements of the encrypted message; and using the customized set of cryptographic computing resources to perform customized cryptographic operations on the encrypted message.

16. The computer program product of claim 15, wherein the processor system method further comprises:

based at least in part on a determination that the cryptographic-operation constraints include the mandatory cryptographic computing resource requirements, performing second resource-scaling operations comprising:

routing the encrypted message to a set of mandatory cryptographic computing resources identified by the mandatory cryptographic computing resource requirements; and using the set of mandatory cryptographic computing resources to perform mandatory cryptographic operations on the encrypted message.

17. The computer program product of claim 15, wherein the processor system method further comprises configuring open-source cryptographic software to:

receive a request to perform cryptographic operations on the encrypted message; and route the request to the processor system instead of performing the request.

18. The computer program product of claim 17, wherein the open-source cryptographic software comprises open-source secure sockets layer (SSL) software.

19. The computer program product of claim 16, wherein:
the first resource-scaling operations further comprise:
capturing a first set of updated cryptographic metrics that result from using the customized set of cryptographic computing resources to perform the customized cryptographic operations on the encrypted message; and updating the cryptographic metrics with the first set of updated cryptographic metrics; and the second resource-scaling operations further comprise:
capturing a second set of updated cryptographic metrics that result from using the set of mandatory cryptographic computing resources to perform mandatory cryptographic operations on the encrypted message; and updating the cryptographic metrics with the second set of updated cryptographic metrics.

20. The computer program product of claim 15, wherein:
the processor system comprises a predictive model trained to utilize machine learning algorithms to determine the cryptographic processing requirements of the encrypted message; the information associated with the encrypted message includes cryptographic computing resource patterns comprising static data; and the performance measurements include cryptographic metrics comprising dynamic data that changes.

* * * * *